US009412117B2

(12) United States Patent
Hansen

(10) Patent No.: US 9,412,117 B2
(45) Date of Patent: *Aug. 9, 2016

(54) AUTOMATED SYSTEM FOR ADAPTING MARKET DATA AND EVALUATING THE MARKET VALUE OF ITEMS

(71) Applicant: BuyMetrics, Inc., Atlanta, GA (US)

(72) Inventor: Valerie Hansen, Racine, WI (US)

(73) Assignee: BuyMetrics, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/808,854

(22) Filed: Jul. 24, 2015

(65) Prior Publication Data

US 2015/0332300 A1 Nov. 19, 2015

Related U.S. Application Data

(63) Continuation of application No. 14/740,630, filed on Jun. 16, 2015, which is a continuation of application No. 14/262,682, filed on Apr. 25, 2014, now Pat. No. 9,092,825, which is a continuation of application No.

(Continued)

(51) Int. Cl.
*G06Q 30/02* (2012.01)
*G06Q 10/08* (2012.01)
(Continued)

(52) U.S. Cl.
CPC .......... *G06Q 30/0206* (2013.01); *G06Q 10/087* (2013.01); *G06Q 20/201* (2013.01); *G06Q 30/02* (2013.01); *G06Q 30/0205* (2013.01); *G06Q 30/0283* (2013.01); *G06Q 30/04* (2013.01);
(Continued)

(58) Field of Classification Search
None
See application file for complete search history.

(56) References Cited

U.S. PATENT DOCUMENTS 1,927,702 A 9/1933 Foss
3,581,072 A 5/1971 Nymeyer
(Continued)

FOREIGN PATENT DOCUMENTS

EP 0 407 026 A2 1/1991
JP 62-139088 A 6/1987
(Continued)

OTHER PUBLICATIONS

Böer et al., "Target Costing Can Boost Your Bottom Line," *Strategic Finance* 81(1):49-52, Jul. 1999.
Burke, "The Effects of Missing Information on Decision Strategy Selection," *Advances in Consumer Research* 17:250-256, 1990.
Lovelock et al., "Developing Global Strategies for Service Businesses," *California Management Review* 38(2):64-86, 1996.
Mantel et al., "The Role of Direction of Comparison, Attribute-Based Processing, and Attitude-Based Processing in Consumer Preference," *Journal of Consumer Research* 25:335-352, Mar. 1999.

(Continued)

*Primary Examiner* — Robert R Niquette
(74) *Attorney, Agent, or Firm* — Seed IP Law Group PLLC

(57) ABSTRACT

A system including a remotely-located service provider server receives one or more product specification data sets. A metrics application invokes an evaluation service and obtains metric data including market reference price data for responsive items at a current time or period of time. Attributes for each responsive item are evaluated to dynamically discover relations within the attribute data that enable a metric server adapter to contextually determine which of the predefined instructions are applicable to the responsive item. One or more adjustment values are generated and applied to the market reference price data for a responsive item that differs by at least one parameter value, transforming the current market reference price data into transaction-specific market reference price data values that are used to generate one or more evaluation metrics. One or more of the received product specification data sets and evaluation metrics are communicated to a user-agent controlled computing device.

176 Claims, 13 Drawing Sheets

Related U.S. Application Data

13/869,942, filed on Apr. 24, 2013, now Pat. No. 8,762,258, which is a continuation of application No. 13/597,200, filed on Aug. 28, 2012, now Pat. No. 8,442,888, which is a continuation of application No. 13/475,900, filed on May 18, 2012, now Pat. No. 8,321,317, which is a continuation of application No. 13/118,351, filed on May 27, 2011, now Pat. No. 8,224,729, which is a continuation of application No. 12/952,083, filed on Nov. 22, 2010, now Pat. No. 7,966,240, which is a continuation of application No. 11/394,540, filed on Mar. 31, 2006, now Pat. No. 7,840,462, which is a continuation of application No. 09/607,502, filed on Jun. 28, 2000, now Pat. No. 7,043,457.

(51) Int. Cl.

| | | |
|---|---|---|
| *G06Q 20/20* | (2012.01) | |
| *G06Q 30/04* | (2012.01) | |
| *G06Q 30/06* | (2012.01) | |
| *G06Q 40/00* | (2012.01) | |
| *G06Q 40/04* | (2012.01) | |
| *G06Q 40/06* | (2012.01) | |
| *G06Q 40/08* | (2012.01) | |
| *G06Q 50/16* | (2012.01) | |
| *G06Q 50/18* | (2012.01) | |

(52) U.S. Cl.
CPC ........ *G06Q 30/0611* (2013.01); *G06Q 30/0629* (2013.01); *G06Q 40/00* (2013.01); *G06Q 40/04* (2013.01); *G06Q 40/06* (2013.01); *G06Q 40/08* (2013.01); *G06Q 40/12* (2013.12); *G06Q 50/16* (2013.01); *G06Q 50/188* (2013.01)

(56) References Cited

U.S. PATENT DOCUMENTS

| | | |
|---|---|---|
| 3,933,305 A | 1/1976 | Murphy |
| 4,412,287 A | 10/1983 | Braddock, III |
| 4,486,853 A | 12/1984 | Parsons |
| 4,674,044 A | 6/1987 | Kalmus et al. |
| 4,868,866 A | 9/1989 | Williams, Jr. |
| 4,903,201 A | 2/1990 | Wagner |
| 4,972,504 A | 11/1990 | Daniel, Jr. et al. |
| 4,992,940 A | 2/1991 | Dworkin |
| 5,063,506 A | 11/1991 | Brockwell et al. |
| 5,077,665 A | 12/1991 | Silverman et al. |
| 5,101,353 A | 3/1992 | Lupien et al. |
| 5,136,501 A | 8/1992 | Silverman et al. |
| 5,168,446 A | 12/1992 | Wiseman |
| 5,172,314 A | 12/1992 | Poland et al. |
| 5,201,047 A | 4/1993 | Maki et al. |
| 5,249,120 A | 9/1993 | Foley |
| 5,293,479 A | 3/1994 | Quitero et al. |
| 5,297,031 A | 3/1994 | Gutterman et al. |
| 5,375,055 A | 12/1994 | Togher et al. |
| 5,414,621 A | 5/1995 | Hough |
| 5,418,943 A | 5/1995 | Borgida et al. |
| 5,446,874 A | 8/1995 | Waclawsky et al. |
| 5,486,995 A | 1/1996 | Krist et al. |
| 5,500,793 A | 3/1996 | Deming, Jr. et al. |
| 5,555,403 A | 9/1996 | Cambot et al. |
| 5,675,785 A | 10/1997 | Hall et al. |
| 5,715,402 A | 2/1998 | Popolo |
| 5,726,914 A | 3/1998 | Janovski et al. |
| 5,727,165 A | 3/1998 | Ordish et al. |
| 5,732,271 A | 3/1998 | Berry et al. |
| 5,732,400 A | 3/1998 | Mandler et al. |
| 5,758,328 A | 5/1998 | Giovannoli |
| 5,761,389 A | 6/1998 | Maeda et al. |
| 5,771,370 A | 6/1998 | Klein |
| 5,774,879 A | 6/1998 | Custy et al. |
| 5,794,207 A | 8/1998 | Walker et al. |
| 5,799,300 A | 8/1998 | Agrawal et al. |
| 5,809,483 A | 9/1998 | Broka et al. |
| 5,822,751 A | 10/1998 | Gray et al. |
| 5,835,896 A | 11/1998 | Fisher et al. |
| 5,842,178 A | 11/1998 | Giovannoli |
| 5,845,266 A | 12/1998 | Lupien et al. |
| 5,857,174 A | 1/1999 | Dugan |
| 5,873,069 A | 2/1999 | Reuhl et al. |
| 5,873,071 A | 2/1999 | Ferstenberg et al. |
| 5,924,082 A | 7/1999 | Silverman et al. |
| 5,924,083 A | 7/1999 | Silverman et al. |
| 5,937,393 A | 8/1999 | O'Leary et al. |
| 5,950,176 A | 9/1999 | Keiser et al. |
| 5,960,411 A | 9/1999 | Hartman et al. |
| 5,963,910 A | 10/1999 | Ulwick |
| 5,987,435 A | 11/1999 | Weiss et al. |
| 5,991,696 A | 11/1999 | McAndrew |
| 5,999,940 A | 12/1999 | Ranger |
| 6,012,046 A | 1/2000 | Lupien et al. |
| 6,023,683 A | 2/2000 | Johnson et al. |
| 6,034,652 A | 3/2000 | Freiberger et al. |
| 6,035,287 A | 3/2000 | Stallaert et al. |
| 6,038,537 A | 3/2000 | Matsuoka |
| 6,038,540 A | 3/2000 | Krist et al. |
| 6,055,516 A | 4/2000 | Johnson et al. |
| 6,055,518 A | 4/2000 | Franklin et al. |
| 6,058,379 A | 5/2000 | Odom et al. |
| 6,061,662 A | 5/2000 | Makivic |
| 6,076,070 A * | 6/2000 | Stack .................. G06Q 30/06 235/375 |
| 6,078,924 A | 6/2000 | Ainsbury et al. |
| 6,085,164 A | 7/2000 | Smith et al. |
| 6,085,196 A | 7/2000 | Motoyama et al. |
| 6,094,651 A | 7/2000 | Agrawal et al. |
| 6,125,391 A | 9/2000 | Meltzer et al. |
| 6,134,536 A | 10/2000 | Shepherd |
| 6,134,548 A | 10/2000 | Gottsman et al. |
| 6,141,653 A | 10/2000 | Conklin et al. |
| 6,161,103 A | 12/2000 | Rauer et al. |
| 6,163,774 A | 12/2000 | Lore et al. |
| 6,205,447 B1 | 3/2001 | Malloy |
| 6,223,164 B1 | 4/2001 | Seare et al. |
| 6,260,024 B1 | 7/2001 | Shkedy |
| 6,278,982 B1 | 8/2001 | Korhammer et al. |
| 6,282,521 B1 | 8/2001 | Howorka |
| 6,285,997 B1 | 9/2001 | Carey et al. |
| 6,311,144 B1 | 10/2001 | Abu El Ata |
| 6,317,728 B1 | 11/2001 | Kane |
| 6,336,105 B1 | 1/2002 | Conklin et al. |
| 6,339,775 B1 | 1/2002 | Zamanian et al. |
| 6,339,776 B2 | 1/2002 | Dayani-Fard et al. |
| 6,341,277 B1 | 1/2002 | Coden et al. |
| 6,347,307 B1 | 2/2002 | Sandhu et al. |
| 6,381,605 B1 | 4/2002 | Kothuri et al. |
| 6,385,604 B1 | 5/2002 | Bakalash et al. |
| 6,389,407 B1 | 5/2002 | Paradis et al. |
| 6,408,282 B1 | 6/2002 | Buist |
| 6,411,936 B1 | 6/2002 | Sanders |
| 6,415,263 B1 | 7/2002 | Doss |
| 6,442,533 B1 | 8/2002 | Hinkle |
| 6,460,020 B1 | 10/2002 | Pool et al. |
| 6,477,536 B1 | 11/2002 | Pasumansky et al. |
| 6,484,158 B1 | 11/2002 | Johnson et al. |
| 6,505,172 B1 | 1/2003 | Johnson et al. |
| 6,505,174 B1 | 1/2003 | Keiser et al. |
| 6,505,175 B1 | 1/2003 | Silverman et al. |
| 6,510,434 B1 | 1/2003 | Anderson et al. |
| 6,535,880 B1 | 3/2003 | Musgrove et al. |
| 6,546,402 B1 | 4/2003 | Beyer et al. |
| 6,553,346 B1 | 4/2003 | Walker et al. |
| 6,556,976 B1 | 4/2003 | Callen |
| 6,564,192 B1 | 5/2003 | Kinney, Jr. et al. |
| 6,609,098 B1 | 8/2003 | DeMarcken |
| 6,618,707 B1 | 9/2003 | Gary |
| 6,629,082 B1 | 9/2003 | Hambrecht et al. |
| 6,654,747 B1 | 11/2003 | Van Huben et al. |
| 6,662,174 B2 | 12/2003 | Shah et al. |
| 6,677,963 B1 | 1/2004 | Mani et al. |
| 6,714,933 B2 | 3/2004 | Musgrove et al. |

(56) References Cited

U.S. PATENT DOCUMENTS

| | | |
|---|---|---|
| 6,778,863 B1 | 8/2004 | Lienhard et al. |
| 6,778,993 B2 | 8/2004 | Wang |
| 6,792,458 B1 | 9/2004 | Muret et al. |
| 6,847,938 B1 | 1/2005 | Moore |
| 6,850,900 B1 | 2/2005 | Hare et al. |
| 6,856,967 B1 | 2/2005 | Woolston et al. |
| 6,907,404 B1 | 6/2005 | Li |
| 6,941,280 B1 | 9/2005 | Gastineau et al. |
| 6,963,854 B1 * | 11/2005 | Boyd ................ G06Q 30/0283 705/1.1 |
| 6,976,006 B1 | 12/2005 | Verma et al. |
| 6,990,238 B1 | 1/2006 | Saffer et al. |
| 6,993,504 B1 | 1/2006 | Friesen et al. |
| 7,003,486 B1 | 2/2006 | Condamoor et al. |
| 7,010,494 B2 | 3/2006 | Etzioni et al. |
| 7,010,511 B1 | 3/2006 | Kinney, Jr. et al. |
| 7,024,376 B1 | 4/2006 | Yuen |
| 7,024,383 B1 | 4/2006 | Mancini et al. |
| 7,031,901 B2 | 4/2006 | Abu El Ata |
| 7,043,457 B1 | 5/2006 | Hansen |
| 7,051,071 B2 | 5/2006 | Stewart et al. |
| 7,058,598 B1 | 6/2006 | Chen et al. |
| 7,072,857 B1 | 7/2006 | Calonge |
| 7,080,033 B2 | 7/2006 | Wilton et al. |
| 7,107,226 B1 | 9/2006 | Cassidy et al. |
| 7,107,230 B1 | 9/2006 | Halbert et al. |
| 7,113,919 B1 | 9/2006 | Norris et al. |
| 7,124,106 B1 | 10/2006 | Stallaert et al. |
| 7,133,835 B1 | 11/2006 | Fusz et al. |
| 7,133,848 B2 | 11/2006 | Phillips et al. |
| 7,149,717 B1 * | 12/2006 | Kan ....................... G06Q 30/00 705/35 |
| 7,165,042 B1 | 1/2007 | Segal et al. |
| 7,171,386 B1 | 1/2007 | Raykhman |
| 7,181,424 B1 | 2/2007 | Ketchum et al. |
| 7,203,661 B2 | 4/2007 | Graff |
| 7,206,756 B1 | 4/2007 | Walsky |
| 7,212,996 B1 | 5/2007 | Carnahan et al. |
| 7,212,997 B1 | 5/2007 | Pine et al. |
| 7,212,999 B2 | 5/2007 | Friesen et al. |
| 7,225,150 B2 | 5/2007 | Wilton et al. |
| 7,231,612 B1 | 6/2007 | Mani et al. |
| 7,233,923 B1 | 6/2007 | Wallace et al. |
| 7,246,092 B1 | 7/2007 | Peterson et al. |
| 7,249,085 B1 | 7/2007 | Kinney, Jr. et al. |
| 7,251,629 B1 | 7/2007 | Marynowski et al. |
| 7,283,979 B2 | 10/2007 | Tulloch et al. |
| 7,296,001 B1 | 11/2007 | Ephrati et al. |
| 7,315,838 B2 | 1/2008 | Gershon |
| 7,346,574 B2 | 3/2008 | Smith et al. |
| 7,373,317 B1 | 5/2008 | Kopelman et al. |
| 7,373,319 B2 | 5/2008 | Kopelman et al. |
| 7,379,898 B2 | 5/2008 | Tenorio |
| 7,383,206 B2 | 6/2008 | Rupp et al. |
| 7,386,497 B1 | 6/2008 | Gooch |
| 7,389,211 B2 | 6/2008 | Abu El Ata et al. |
| 7,392,214 B1 | 6/2008 | Fraser et al. |
| 7,424,452 B2 | 9/2008 | Feilbogen et al. |
| 7,430,531 B1 | 9/2008 | Snyder |
| 7,447,653 B1 | 11/2008 | Watanabe et al. |
| 7,467,110 B2 | 12/2008 | Müller et al. |
| 7,472,087 B2 | 12/2008 | Keith |
| 7,509,261 B1 | 3/2009 | McManus et al. |
| 7,509,283 B2 | 3/2009 | Friesen et al. |
| 7,536,335 B1 | 5/2009 | Weston et al. |
| 7,552,095 B2 | 6/2009 | Kalyan |
| 7,562,047 B2 | 7/2009 | Friesen et al. |
| 7,577,582 B1 | 8/2009 | Ojha et al. |
| 7,577,606 B1 | 8/2009 | Ford |
| 7,584,144 B2 | 9/2009 | Friesen et al. |
| 7,603,286 B2 | 10/2009 | Ouimet |
| 7,653,583 B1 | 1/2010 | Leeb et al. |
| 7,660,738 B1 | 2/2010 | Siegel et al. |
| 7,680,723 B2 | 3/2010 | Friesen et al. |
| 7,684,144 B1 | 3/2010 | Goker et al. |
| 7,685,048 B1 | 3/2010 | Hausman et al. |
| 7,689,495 B1 | 3/2010 | Kim et al. |
| 7,702,615 B1 | 4/2010 | Delurgio et al. |
| 7,725,358 B1 | 5/2010 | Brown et al. |
| 7,725,383 B2 | 5/2010 | Wilton et al. |
| 7,742,934 B2 | 6/2010 | Offutt, Jr. et al. |
| 7,752,122 B2 | 7/2010 | Friesen et al. |
| 7,765,140 B1 | 7/2010 | Megiddo |
| 7,769,612 B1 | 8/2010 | Walker et al. |
| 7,835,970 B1 | 11/2010 | Marchegiani |
| 7,840,476 B1 | 11/2010 | Zack et al. |
| 7,958,013 B2 | 6/2011 | Porat et al. |
| 7,970,713 B1 | 6/2011 | Gorelik et al. |
| 7,979,347 B1 | 7/2011 | Greener et al. |
| 8,005,684 B1 | 8/2011 | Cheng et al. |
| 8,150,735 B2 | 4/2012 | Walker et al. |
| 8,229,831 B2 | 7/2012 | Fraser et al. |
| 8,326,697 B2 | 12/2012 | Kopelman et al. |
| 8,407,116 B1 | 3/2013 | Serkin et al. |
| 8,554,659 B2 | 10/2013 | Annunziata |
| 8,688,564 B2 | 4/2014 | Friesen et al. |
| 8,768,824 B2 | 7/2014 | Friesen et al. |
| 2001/0032116 A1 | 10/2001 | Hyatt |
| 2001/0032163 A1 | 10/2001 | Fertik et al. |
| 2001/0032171 A1 * | 10/2001 | Brink ..................... G06Q 40/04 705/37 |
| 2002/0007324 A1 | 1/2002 | Centner et al. |
| 2002/0010663 A1 | 1/2002 | Muller |
| 2002/0019794 A1 | 2/2002 | Katz et al. |
| 2002/0026403 A1 | 2/2002 | Tambay et al. |
| 2002/0026630 A1 | 2/2002 | Schmidt et al. |
| 2002/0069134 A1 | 6/2002 | Solomon |
| 2002/0111873 A1 | 8/2002 | Ehrlich et al. |
| 2002/0152135 A1 | 10/2002 | Beeri et al. |
| 2002/0156685 A1 | 10/2002 | Ehrlich et al. |
| 2003/0065586 A1 | 4/2003 | Shaftel et al. |
| 2003/0093343 A1 | 5/2003 | Huttenlocher et al. |
| 2003/0097328 A1 | 5/2003 | Lundberg et al. |
| 2003/0233305 A1 | 12/2003 | Solomon |
| 2004/0015415 A1 * | 1/2004 | Cofino ................ G06Q 10/063 705/7.11 |
| 2005/0010494 A1 | 1/2005 | Mourad et al. |
| 2005/0021366 A1 * | 1/2005 | Pool .................... G06F 17/2827 705/26.1 |
| 2006/0015413 A1 * | 1/2006 | Giovannoli ............ G06Q 30/06 705/26.1 |
| 2006/0253334 A1 | 11/2006 | Fukasawa |
| 2007/0250431 A1 | 10/2007 | Olof-Ors |
| 2008/0071638 A1 | 3/2008 | Wanker |
| 2008/0077542 A1 | 3/2008 | McElhiney et al. |
| 2008/0270221 A1 | 10/2008 | Clemens et al. |
| 2009/0083120 A1 | 3/2009 | Strichman et al. |
| 2009/0138411 A1 | 5/2009 | O'Callahan |
| 2010/0023379 A1 | 1/2010 | Rappaport et al. |
| 2010/0082419 A1 | 4/2010 | Au-Yeung et al. |
| 2010/0185554 A1 | 7/2010 | Sivasundaram et al. |

FOREIGN PATENT DOCUMENTS

| | | |
|---|---|---|
| WO | 96/08783 A1 | 3/1996 |
| WO | 97/31322 A1 | 8/1997 |
| WO | 00/16232 A1 | 3/2000 |
| WO | 01/63521 A2 | 8/2001 |

OTHER PUBLICATIONS

O'Brien, "A Day at the Park Costs More Than Ever," *Amusement Business* 108(25):3-5, Jun. 1996.

Plotkin, "Business Rules Everywhere, Part 2," *Intelligent Enterprise* 2(10):42-48, Jul. 1999.

Plott et al., "Instability of Equilibria in Experimental Markets: Upward-Sloping Demands, Externalities, and Fad-Like Incentives," *Southern Economic Journal* 65(3):405-426, 1999.

* cited by examiner

| File Edit View Favorites Tools Help |
|---|
| BACK FORWARD STOP REFRESH HOME SEARCH FAVORITES HISTORY MAIL SIZE PRINT |
| LINKS » ADDRESS http://www.probuild.com/buymetrics/SoftwoodTally.asp?MetricID=194$Action=FromSummary GO |

New Softwood RFQ    List Open Softwoods RFQs    List Submitted Softwoods RFQs    List Closed Softwoods RFQs    Tally Calculator - Manager
New Panel RFQ    List Open Panels RFQs    List Submitted Panels RFQs    List Closed Panels RFQs
New Program and Buy RFQ    List Unsolicited Offers Lumber Type:
2 x 4 WSPF 2&B
2 x 6 WSPF 2&B
2 x 4 ESPF 2&B Boston
2 x 8 WSPF 2&B
2 x 10 WSPF 2&B Calculate

| PCS Per Unit: | Price/M | Lumber Dimension: | Freight: | Metric $/M: | Quote $/Metric $ |
|---|---|---|---|---|---|
| 294 | 322 | 2 x 4 | | 331.791 | 0.970490 |

| Length | Qty | PCS | Piece | BF Total | Invoice Cost | Price | Spec Cost | Adj Cost | Metric $/M | Adj Piece Cost | Total: |
|---|---|---|---|---|---|---|---|---|---|---|---|
| 8 | 4 | 1176 | 5.3333 | 6272 | 2019.584 | 220 | 1881.6 | 1826.075 | 291.147 | 1.553 | 1826.328 |
| 10 | 4 | 1176 | 6.6667 | 7840 | 2524.48 | 225 | 2391.2 | 2320.636 | 295.999 | 1.973 | 2320.248 |
| 12 | 6 | 1764 | 8 | 14112 | 4544.064 | 220 | 4233.6 | 4108.668 | 291.147 | 2.329 | 4108.356 |
| 14 | 2 | 588 | 9.3333 | 5488 | 1767.136 | 260 | 1865.92 | 1810.857 | 329.967 | 3.08 | 1811.04 |
| 16 | 6 | 1764 | 10.6667 | 18816 | 6058.752 | 295 | 7056 | 6847.78 | 363.934 | 3.882 | 6847.848 |
| 18 | | 0 | 12 | | | 285 | | | | | |
| 20 | | 0 | 13.3333 | | | 285 | | | | | |
| TOTALS | 22 | 6468 | | 52528 | 16914.016 | | 17428.32 | 16914.016 | | | 16913.82 |

AUTOMATED SYSTEM FOR ADAPTING MARKET DATA AND EVALUATING THE MARKET VALUE OF ITEMS

BACKGROUND

1. Technical Field

This present disclosure generally relates to electronic commerce software applications and, more particularly, to evaluating prices and transactions for purchasing.

2. Description of the Related Art

Commodity items such as lumber, agricultural products, metals, and livestock/meat are usually traded in the open market between a number of buyers and sellers. The sales transactions of most commodity items involve a number of parameters. For instance, in the trade of commodity lumber, a buyer usually orders materials by specifying parameters such as lumber species, grade, size (i.e., 2×4, 2×10, etc.), and quantity (size of order), as well as the "tally" or mix of units of various lengths within the shipment, method of transportation (i.e., rail or truck), shipping terms (i.e., FOB or delivered), payment terms, and desired date of receipt, with each parameter influencing the value of the commodity purchase. Given the multiple possible combinations of factors, a commodity buyer often finds it difficult to objectively compare similar but unequal offerings among competing vendors.

For example, in a case where a lumber buyer desires to order a railcar load of spruce (SPF) 2×4's of #2 & Better grade, the buyer would query vendors offering matching species and grade carloads seeking the best match for the buyer's need or tally preference at the lowest market price. Lumber carloads are quoted at a price per thousand board feet for all material on the railcar. When the quoted parameters are not identical, it is very difficult for buyers to determine the comparative value of unequal offerings.

Typically, a lumber buyer will find multiple vendors each having different offerings available. For example, a railcar of SPF 2×4's may be quoted at a rate of $300/MBF (thousand board feet) by multiple vendors. Even though the MBF price is equal, one vendor's carload may represent significantly greater marketplace value because it contains the more desirable lengths of 2×4's, such as market-preferred 16-foot 2×4's. When the offering price varies in addition to the tally of lengths, it becomes increasingly difficult to compare quotes from various vendors. Further, because construction projects often require long lead times, the lumber product may need to be priced now, but not delivered until a time in the future. Alternately, another species of lumber (i.e., southern pine) may represent an acceptable substitute. Therefore, from the foregoing, there is a need for a method and system that allows buyers to evaluate the price of commodity offerings possessing varying parameters.

BRIEF SUMMARY

Described herein is a computing system that operates in a networked service provider environment usable via system-managed user interfaces. The system has a governing logic application for managing market reference data that operates independently from, yet in coordination with, a separate production application. In at least one aspect, the system comprises a remotely-located service provider server that includes a network interface, a non-transitory computer-readable medium having computer-executable instructions stored thereon, and a processor in communication with the network interface and the computer-readable medium. When executed, the computer-executable instructions implement a plurality of applications including a metric server adapter and a metrics application. The processor is configured to execute the computer-executable instructions stored in the computer-readable medium.

The metric server adapter is a governing logic application programmed to autonomously manage at least one evaluation service and a plurality of predefined instructions for managing metric data, including a user-agent's customized instructions or industry-specific instructions, to dynamically define transaction-specific instructions for adapting metric data, and to coordinate a conditional execution of transaction-specific instructions for adapting metric data by the metrics application. One or more of the predefined instructions are preassociated with attributes predefined for an item and/or one or more parameter values. The parameter values representing attributes or conditions that are variable for specific items or transactions. The predefined instructions are stored in a memory accessible to the service provider server.

The metrics application is a production application programmed to control invocation of the at least one evaluation service and, in coordination with the metric server adapter, to conditionally execute one or more transaction-specific instructions for adapting metric data and generate one or more evaluation metrics that pertain to a user-agent and the at least one evaluation service. The metrics application is further programmed to manage one or more user interfaces that facilitate communications with the remotely-located service provider server.

In at least one aspect of the present disclosure, in operation and in response to receiving a triggering request from a user-agent controlled computing device, the metrics application provides at least one user interface that identifies the user-agent initiating the at least one evaluation service. The metrics application configures the service provider server to receive, from the user-agent controlled computing device, via a system-managed user interface, one or more product specification data sets. Each product specification data set identifies at least one item that is defined by a plurality of attributes having attribute data that includes two or more parameter values, or identifies a plurality of items defined by a plurality of attributes that differ in accordance with at least one parameter value.

Receipt of at least one product specification data set triggers the metrics application to automatically invoke the at least one evaluation service. Invoking the at least one evaluation service causes the metrics application to obtain metric data from at least one data source accessible to the service provider server for each product specification data set. The obtained metric data represents market reference data for at least one item having attributes that are responsive to attributes of the at least one item as identified in the product specification data set. Each responsive item in the market reference data is defined by a plurality of attributes having attribute data that includes at least one parameter value and represents market reference price data for the one or more responsive items at a current time or period of time.

The metrics application further configures the service provider server to evaluate the plurality of attributes defined for each responsive item in the metric data relative to the plurality of attributes for the respective item as identified in the product specification data set to dynamically discover relations within the attribute data. Discovery of one or more relationships comprising a difference in the attribute data triggers an automatic disclosure of the one or more relationships to the metric server adapter. The discovered relationships enable the metric server adapter to contextually determine which of the predefined instructions that pertain to the user-agent and the at least one evaluation service are applicable to the responsive item in the metric data. The metric server adapter uses the attributes and one or more parameter values identified for the respective item in the product specification data set with the predefined instructions determined to be applicable to the responsive item in the metric data to dynamically define transaction-specific instructions for adapting the metric data for the respective item.

The metrics application normalizes the metric data by conditionally executing, in coordination with the metric server adapter, the transaction-specific instructions for adapting metric data as defined for each responsive item in the metric data for the respective item. Execution of at least one transaction-specific instruction causes one or more adjustment values to be generated and applied to the market reference price data for at least one responsive item that differs by at least one parameter value from the respective item identified in the product specification data set, transforming the current market reference price data for the at least one responsive item and automatically producing one or more transaction-specific market reference price data values for the respective item as identified in the product specification data set.

The metrics application generates one or more evaluation metrics that pertain to the user-agent and the at least one evaluation service for the at least one item as identified in each product specification data set, wherein each evaluation metric is based, at least in part, on the one or more transaction-specific market reference data values produced for the respective item as identified in the product specification data set.

The metrics application is further programmed to manage at least one user interface that, in operation, triggers an event, via the network interface, which causes the user-agent controlled computing device to be activated and configured for a data exchange. The metrics application configures the remotely-located service provider server to communicate, via the network interface, one or more of the received product specification data sets and the one or more evaluation metrics generated for at least one item as identified in each communicated product specification data set, and to execute movement of the data to at least the user-agent controlled computing device from which the one or more product specification data sets were received.

In another aspect of the present disclosure, in response to receipt of a triggering event or at a predefined time or over a predefined interval of time, the metrics application configures the service provider server to retrieve, from one or more data storages accessible to the service provider server, at least one evaluation metric previously generated for at least one item as identified in at least one product specification data set or price data set that was previously processed by the service provider server for the user-agent. The at least one item is defined by a plurality of attributes including two or more parameter values, or includes two or more items that are defined by a plurality of attributes that differ in accordance with at least one parameter value. Retrieval of at least one evaluation metric triggers the metrics application to automatically invoke the at least one evaluation service.

Invoking the at least one evaluation service causes the metrics application to obtain metric data from at least one source accessible to the service provider server. The obtained metric data represents market reference data for at least one item having attributes responsive to attributes as identified for the at least one item in the evaluation metric retrieved. Each responsive item in the market reference data is defined by a plurality of attributes having attribute data that includes at least one parameter value and represents market reference price data associated with the one or more responsive items at a current time or period of time.

The metrics application further configures the service provider server to evaluate the plurality of attributes for each responsive item in the metric data relative to the plurality of attributes identified for the respective item in the retrieved evaluation metric to dynamically discover relations within the attribute data. Discovery of one or more relationships comprising a difference in the attribute data triggers an automatic disclosure of the one or more relationships to the metric server adapter. The discovered relationships enable the metric server adapter to contextually determine which of the predefined instructions that pertain to the at least one evaluation service are applicable to the responsive item in the metric data. The metric server adapter uses the attributes and one or more parameter values identified for the respective item in the retrieved evaluation metric with predefined instructions determined to be applicable to the responsive item in the metric data to dynamically define transaction-specific instructions for adapting the metric data for the respective item.

The metrics application normalizes the metric data by conditionally executing, in coordination with the metric server adapter, the transaction-specific instructions for adapting metric data as defined for each responsive item in the metric data. Execution of the at least one transaction-specific instruction causes one or more adjustment values to be generated and applied to the market reference price data for at least one responsive item that differs by at least one parameter value from the respective item in the retrieved evaluation metric, transforming the current market reference price data for the at least one responsive item and automatically producing one or more more-current transaction-specific market reference data sets for the respective item in the retrieved evaluation metric, The metrics application generates at least one more-current evaluation metric for the at least one item as identified in the retrieved evaluation metric. The at least one more-current evaluation metric is based, at least in part, on the one or more more-current transaction-specific market reference data values produced for the at least one item in the retrieved evaluation metric.

The metrics application is further programmed to manage at least one user interface that, in operation, triggers an event, via the network interface, which causes a user-agent controlled computing device to be activated and configured for a data exchange. The metrics application configures the remotely-located service provider server to communicate, via the network interface, the at least one more-current evaluation metric generated for the at least one item in the retrieved evaluation metric, and to execute movement of the data to at least a user-agent controlled computing device.

In yet another aspect of the present disclosure, in response to a triggering event or at a predefined time or over a predefined interval of time, the metrics application configures the service provider server to retrieve, from one or more data storages or data sources accessible to the service provider server, at least one product specification data set or price data set previously processed by the service provider server. The at least one retrieved data set meets one or more criteria predefined in the at least one user-agent customized instruction and identifies at least one item defined by a plurality of attributes having attribute data that includes two or more parameter values, or identifies a plurality of items defined by a plurality of attributes that differ in accordance with at least one parameter value. Retrieval of at least one data set triggers the metrics application to automatically invoke the at least one evaluation service.

Invoking the at least one evaluation service causes the metrics application to obtain metric data from at least one data source accessible to the service provider server for each retrieved data set. The obtained metric data represents market reference data for at least one item having attributes that are responsive to attributes of the at least one item as identified in the retrieved data set. Each responsive item in the market reference data is defined by a plurality of attributes having attribute data that includes at least one parameter value and represents market reference price data for the one or more responsive items at a current time or period of time.

The metrics application further configures the service provider server to evaluate the plurality of attributes defined for each responsive item in the metric data relative to the plurality of attributes for the respective at least one item as identified in the retrieved data set to dynamically discover relations within the attribute data. Discovery of one or more relationships comprising a difference in the attribute data triggers an automatic disclosure of the one or more relationships to the metric server adapter. The discovered relationships enable the metric server adapter to contextually determine which of the predefined instructions that pertain to the user-agent and the at least one evaluation service are applicable to the responsive item in the metric data. The metric server adapter uses the attributes and one or more parameter values identified for the respective item in the retrieved data set with predefined instructions determined to be applicable to the responsive item in the metric data to dynamically define transaction-specific instructions for adapting the metric data for the respective item.

The metrics application normalizes the metric data by conditionally executing, in coordination with the metric server adapter, the transaction-specific instructions for adapting metric data as defined for each responsive item in the metric data for the respective item. execution of at least one transaction-specific instruction causes one or more adjustment values to be generated and applied to the market reference price data for at least one responsive item that differs by at least one parameter value from the respective at least one item identified in the retrieved data set, transforming the current market reference price data for the at least one responsive item and automatically producing one or more more-current transaction-specific market reference data values for the respective item as identified in the retrieved data set.

The metrics application generates one or more evaluation metrics that pertain to the user-agent and the at least one evaluation service for the at least one item as identified in each retrieved data set. Each evaluation metric is based, at least in part, on the one or more more-current transaction-specific market reference price data values produced for the respective item as identified in the retrieved data set.

The metrics application is further programmed to manage at least one user interface that, in operation, triggers an event, via the network interface, which causes a user-agent controlled computing device to be activated and configured for a data exchange. The metrics application configures the remotely-located service provider server to communicate, via the network interface, one or more evaluation metrics generated for the at least one item as identified in the at least one retrieved data set, and to execute movement of the data to at least a user-agent controlled computing device.

BRIEF DESCRIPTION OF THE SEVERAL VIEWS OF THE DRAWINGS

The foregoing aspects and many of the attendant advantages of the present disclosure will become more readily appreciated as the same become better understood by reference to the following detailed description, when taken in conjunction with the accompanying drawings, wherein:

FIGS. 8A-8D are images of windows produced by a Web browser application installed on a client computer accessing a server illustrating one embodiment of the present disclosure.

DETAILED DESCRIPTION

Figure 1:
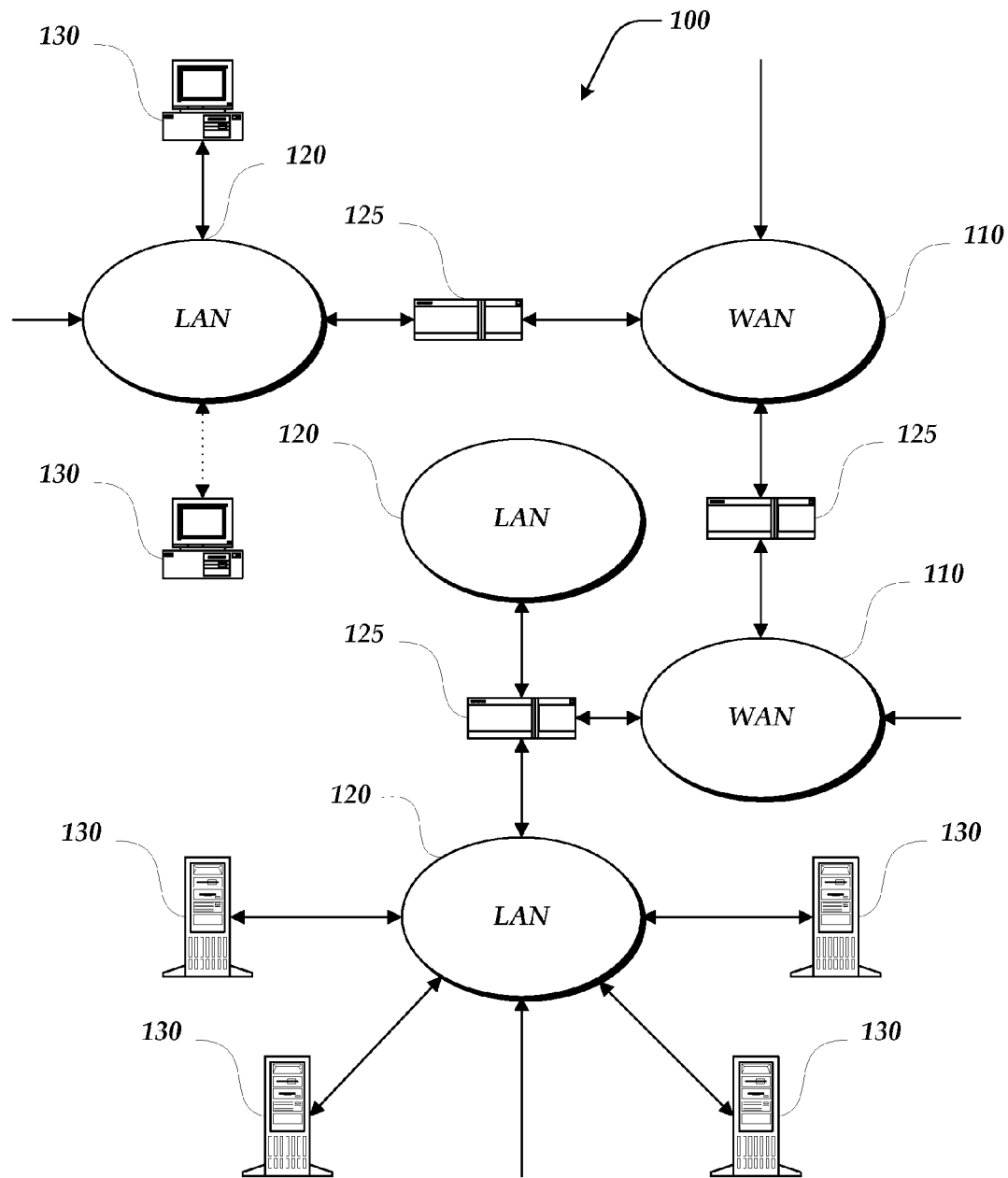
FIG. 1 is a block diagram of a prior art representative portion of the Internet.

The term "Internet" refers to the collection of networks and routers that use the Internet Protocol (IP) to communicate with one another. A representative section of the Internet 100 as known in the prior art is shown in FIG. 1 in which a plurality of local area networks (LANs) 120 and a wide area network (WAN) 110 are interconnected by routers 125. The routers 125 are generally special-purpose computers used to interface one LAN or WAN to another. Communication links within the LANs may be twisted wire pair, or coaxial cable, while communication links between networks may utilize 56 Kbps analog telephone lines, or 1 Mbps digital T-1 lines, and/or 45 Mbps T-3 lines. Further, computers and other related electronic devices can be remotely connected to either the LANs 120 or the WAN 110 via a modem and temporary telephone link. Such computers and electronic devices 130 are shown in FIG. 1 as connected to one of the LANs 120 via dotted lines. It will be appreciated that the Internet comprises a vast number of such interconnected networks, computers, and routers and that only a small representative section of the Internet 100 is shown in FIG. 1.

Figure 2:
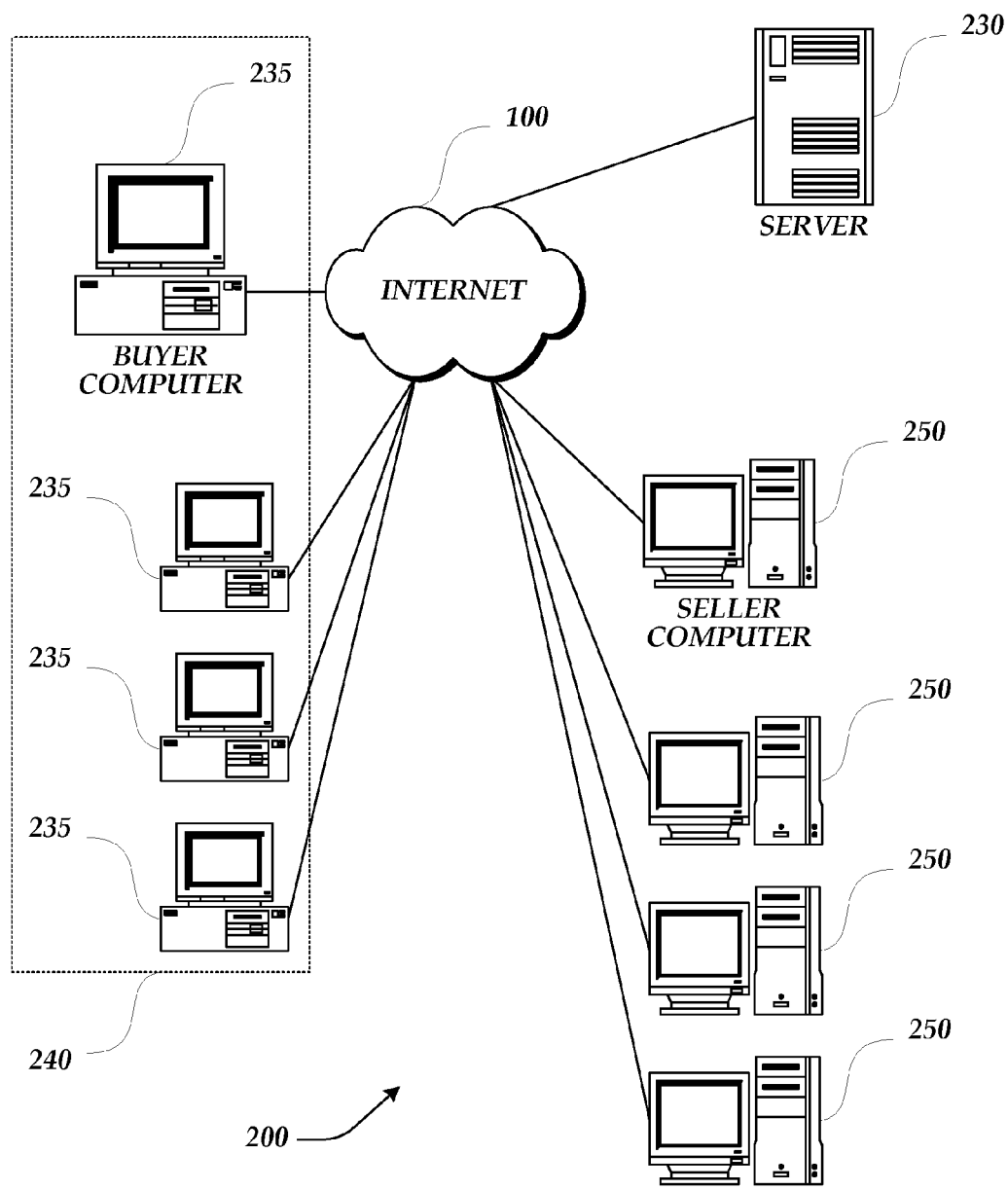
FIG. 2 is a pictorial diagram of a system of devices connected to the Internet, which depict the travel route of data.

The World Wide Web (WWW), on the other hand, is a vast collection of interconnected, electronically stored information located on servers connected throughout the Internet 100. Many companies are now providing services and access to their content over the Internet 100 using the WWW. In accordance with the present disclosure, and as shown in FIG. 2, there may be a plurality of buyers operating a plurality of client computing devices 235. FIG. 2 generally shows a system 200 of computers and devices to which an information server 230 is connected and to which the buyers' computers 235 are also connected. Also connected to the Internet 100 is a plurality of computing devices 250 associated with a plurality of sellers. The system 200 also includes a communications program, referred to as CEA, which is used on the sellers' computing devices 250 to create a communication means between the sellers' backend office software and the server applications.

The buyers of a market commodity may, through their computers 235, request information about a plurality of items or order over the Internet 100 via a Web browser installed on the buyers' computers. Responsive to such requests, the information server 230, also referred to as a server 230, may combine the first buyer's information with information from other buyers on other computing devices 235. The server 230 then transmits the combined buyer data to the respective computing devices 250 associated with the plurality of sellers. Details of this process are described in more detail below in association with FIGS. 5-7.

Those of ordinary skill in the art will appreciate that in other embodiments of the present disclosure, the capabilities of the server 230 and/or the client computing devices 235 and 250 may all be embodied in the other configurations. Consequently, it would be appreciated that in these embodiments, the server 230 could be located on any computing device associated with the buyers' or sellers' computing devices. Additionally, those of ordinary skill in the art will recognize that while only four buyer computing devices 235, four seller computing devices 250, and one server 230 are depicted in FIG. 2, numerous configurations involving a vast number of buyer and seller computing devices and a plurality of servers 230, equipped with the hardware and software components described below, may be connected to the Internet 100.

Figure 3:
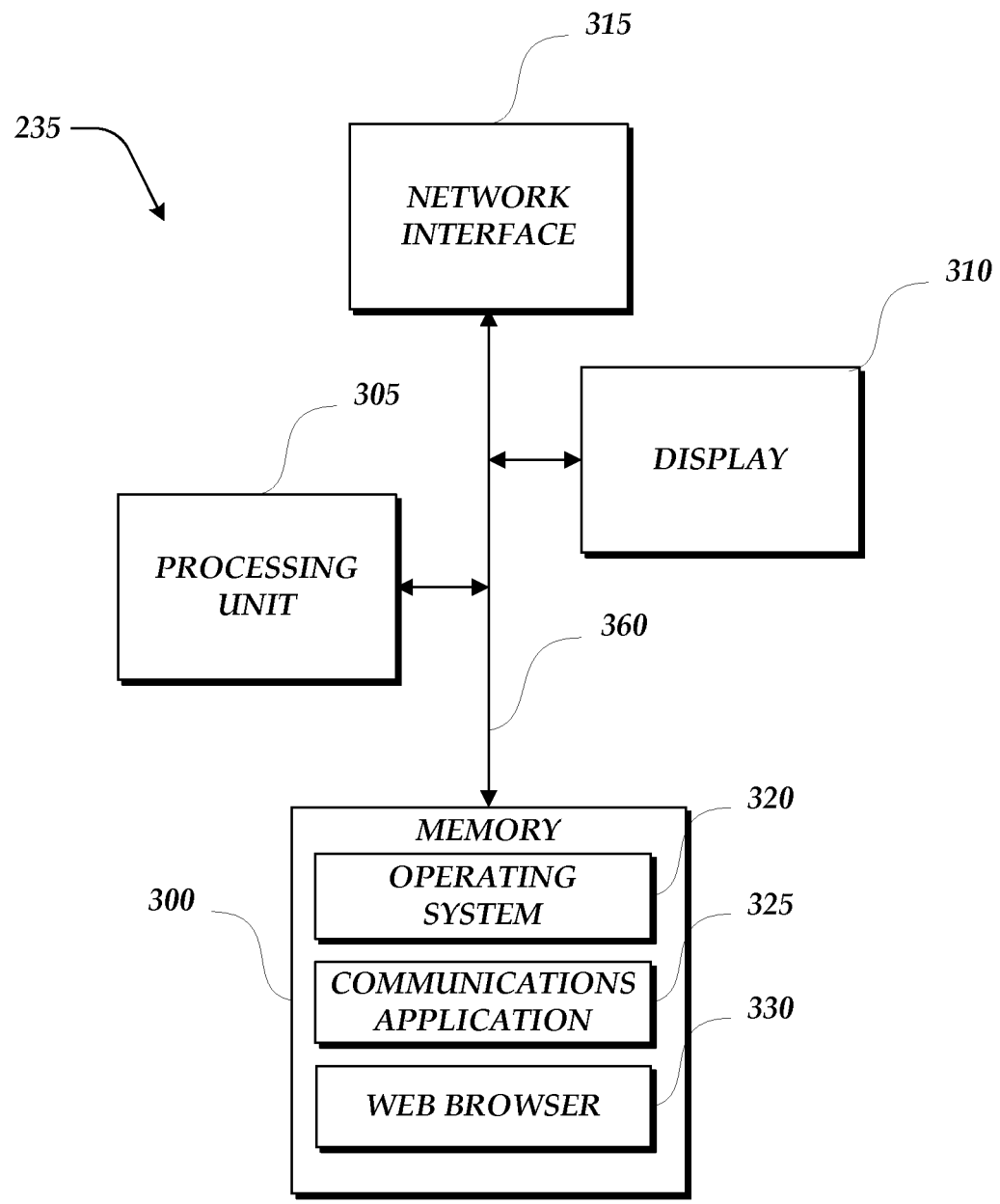
FIG. 3 is a block diagram of the several components of the buyer's computer shown in FIG. 2 that is used to request information on a particular route.

FIG. 3 depicts several of the key components of the buyer's client computing device 235. As known in the art, client computing devices 235 are also referred to as "clients" or "devices," and client computing devices 235 also include other devices such as palm computing devices, cellular telephones, or other like forms of electronics. A client computing device can also be the same computing device as the server 230. An "agent" can be a person, server, or a client computing device 235 having software configured to assist the buyer in making purchasing decisions based on one or more buyer-determined parameters. Those of ordinary skill in the art will appreciate that the buyer's computer 235 in actual practice will include many more components than those shown in FIG. 3. However, it is not necessary that all of these generally conventional components be shown in order to disclose an illustrative embodiment for practicing the present invention. As shown in FIG. 3, the buyer's computer includes a network interface 315 for connecting to the Internet 100. Those of ordinary skill in the art will appreciate that the network interface 315 includes the necessary circuitry for such a connection and is also constructed for use with TCP/IP protocol.

The buyer's computer 235 also includes a processing unit 305, a display 310, and a memory 300, all interconnected along with the network interface 315 via a bus 360. The memory 300 generally comprises a random access memory (RAM), a read-only memory (ROM), and a permanent mass storage device, such as a disk drive. The memory 300 stores the program code necessary for requesting and/or depicting a desired route over the Internet 100 in accordance with the present disclosure. More specifically, the memory 300 stores a Web browser 330, such as Netscape's NAVIGATOR® or Microsoft's INTERNET EXPLORER® browsers, used in accordance with the present disclosure for depicting a desired route over the Internet 100. In addition, memory 300 also stores an operating system 320 and a communications application 325. It will be appreciated that these software components may be stored on a computer-readable medium and loaded into memory 300 of the buyers' computer 235 using a drive mechanism associated with the computer-readable medium, such as a floppy, tape, or CD-ROM drive.

Figure 4:
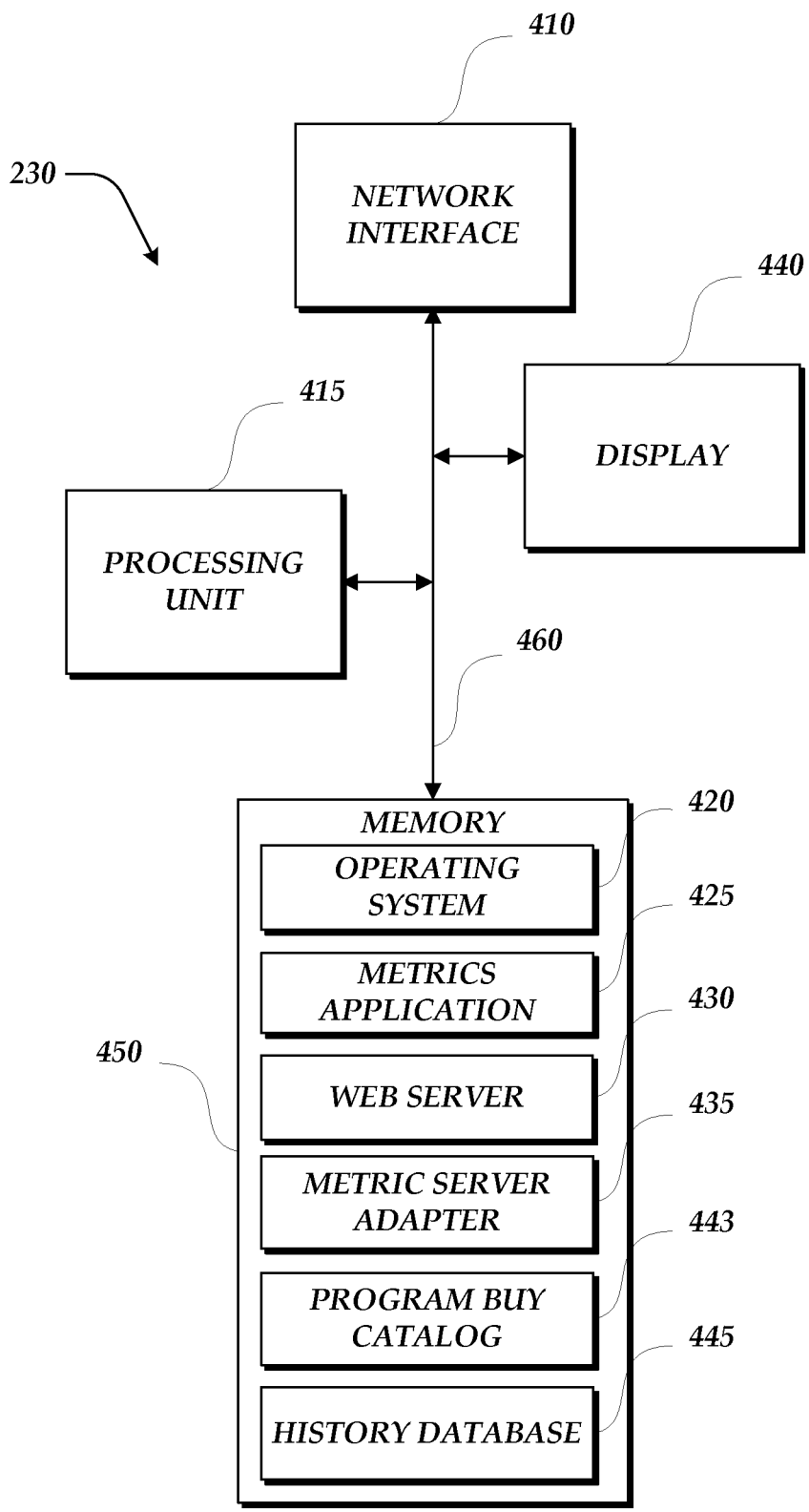
FIG. 4 is a block diagram of the several components of an information server shown in FIG. 2 that is used to supply information on a particular route.

As will be described in more detail below, the user interface which allows products to be ordered by the buyers are supplied by a remote server, i.e., the information server 230 located elsewhere on the Internet, as illustrated in FIG. 2. FIG. 4 depicts several of the key components of the information server 230. Those of ordinary skill in the art will appreciate that the information server 230 includes many more components than shown in FIG. 4. However, it is not necessary that all of these generally conventional components be shown in order to disclose an illustrative embodiment for practicing the present invention. As shown in FIG. 4, the information server 230 is connected to the Internet 100 via a network interface 410. Those of ordinary skill in the art will appreciate that the network interface 410 includes the necessary circuitry for connecting the information server 230 to the Internet 100, and is constructed for use with TCP/IP protocol.

The information server 230 also includes a processing unit 415, a display 440, and a mass memory 450, all interconnected along with the network interface 410 via a bus 460. The mass memory 450 generally comprises a random access memory (RAM), read-only memory (ROM), and a permanent mass storage device, such as a hard disk drive, tape drive, optical drive, floppy disk drive, or combination thereof. The mass memory 450 stores the program code and data necessary for incident and route analysis as well as supplying the results of that analysis to consumers in accordance with the present disclosure. More specifically, the mass memory 450 stores a metrics application 425 formed in accordance with the present disclosure for managing the purchase forums of commodities products, and a metric server adapter 435 for managing metric data. In addition, mass memory 450 stores a database 445 of buyer information continuously logged by the information server 230 for statistical market analysis. It will be appreciated by those of ordinary skill in the art that the database 445 of product and buyer information may also be stored on other servers or storage devices connected to either the information server 230 or the Internet 100. Finally, mass memory 450 stores Web server software 430 for handling requests for stored information received via the Internet 100 and the WWW, and an operating system 420. It will be appreciated that the aforementioned software components may be stored on a computer-readable medium and loaded into mass memory 450 of the information server 230 using a drive mechanism associated with the computer-readable medium, such as floppy, tape, or CD-ROM drive. In addition, the data stored in the mass memory 450 and other memory can be "exposed" to other computers or persons for purposes of communicating data. Thus, "exposing" data from a computing device could mean transmitting data to another device or person, transferring XML data packets, transferring data within the same computer, or other like forms of data communications.

Figure 5:
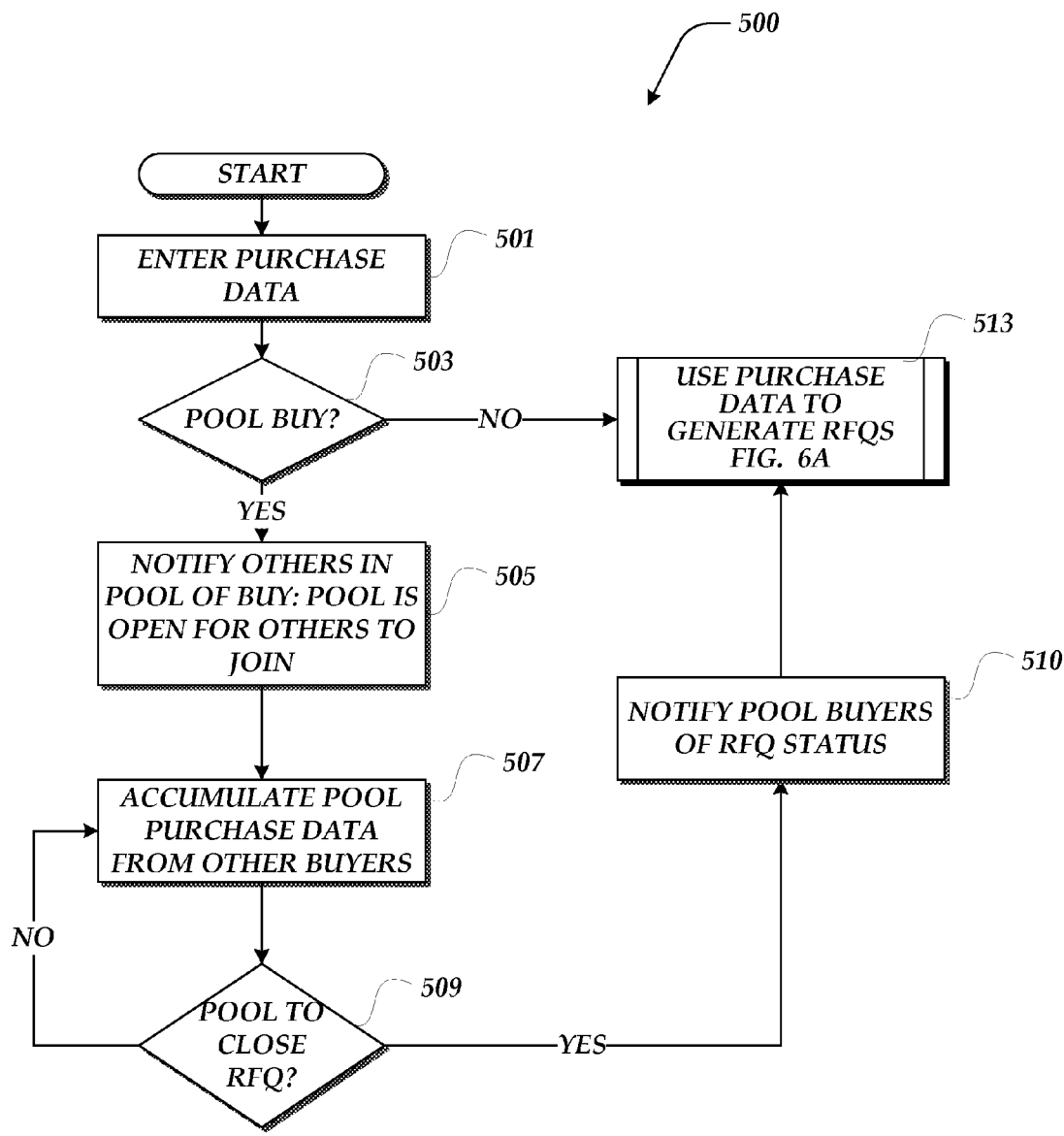
FIG. 5 is a flow diagram illustrating the logic of a routine used by the information server to receive and process the buyer's actions.

In accordance with one embodiment of the present disclosure, FIG. 5 is a flow chart illustrating the logic implemented for the creation of a Request for Quote (RFQ) by a singular buyer or a pool of buyers. In process of FIG. 5, also referred to as the pooling process 500, a buyer or a pool of buyers generate an RFQ which is displayed or transmitted to a plurality of sellers. Responsive to receiving the RFQ, the sellers then send quotes to the buyers.

In summary, the creation of the RFQ consists of at least one buyer initially entering general user identification information to initiate the process. The buyer would then define a Line Item on a Web page displaying an RFQ form. The Line Item is defined per industry specification and units of product are grouped as a "tally" per industry practice. The pooling process 500 allows buyers to combine RFQ Line Items with other buyers with like needs. In one embodiment, the pool buy feature is created by a graphical user interface where the RFQ Line Items from a plurality of buyers are displayed on a Web page to one of the pool buyers, referred to as the pool administrator. The server 230 also provides a Web-based feature allowing the pool administrator to selectively add each RFQ Line Item to one combined RFQ. The combined RFQ is then sent to at least one vendor or seller. This feature provides a forum for pooling the orders of many buyers, which allows individual entities or divisions of larger companies to advantageously bid for larger orders, thus providing them with more bidding power and the possibility of gaining a lower price.

Figure 8A:
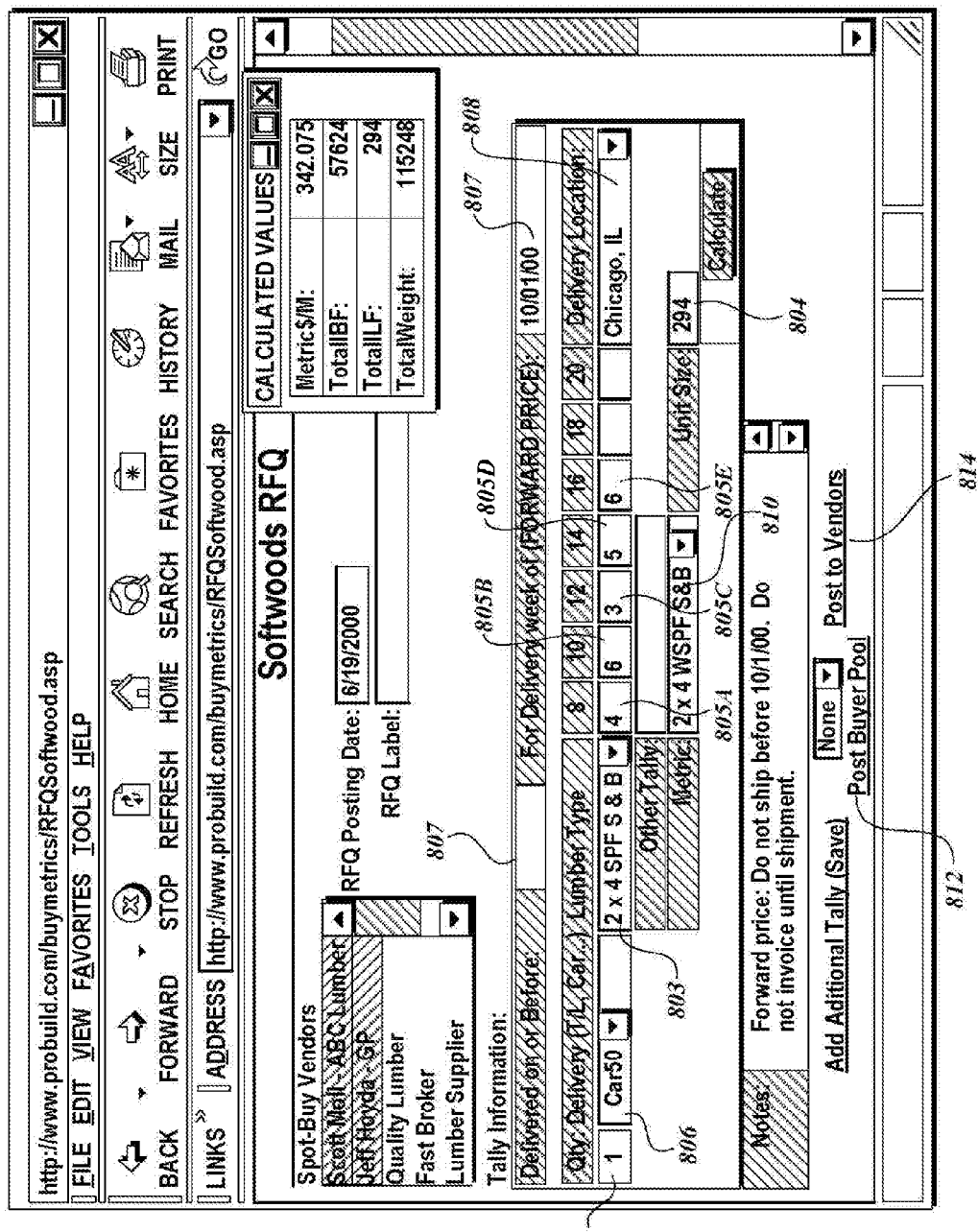

The pooling process 500 begins in step 501 where a buyer initiates the process by providing buyer purchase data. In step 501, the buyer accesses a Web page transmitted from the server 230 configured to receive the buyer purchase data, also referred to as the product specification data set or the Line Item data. One exemplary Web page for the logic of step 501 is depicted in FIG. 8A. As shown in FIG. 8A, the buyer enters the Line Item data specifications in the fields of the Web page. The Line Item data consists of lumber species and grade 803, number of pieces per unit 804, quantities of the various units comprising the preferred assortment in the tally 805A-E, delivery method 806, delivery date 807, delivery location 808, and the overall quantity 809. In one embodiment, the buyer must define the delivery date as either contemporaneous "on-or-before" delivery date or specify a delivery date in the future for a "Forward Price" RFQ. In addition, the buyer selects a metric or multiple metrics in a field 810 per RFQ Line Item (tally). As described in more detail below, the metric provides pricing data that is used as a reference point for the buyer to compare the various quotes returned from the sellers. The buyer RFQ Line Item data is then stored in the memory of the server 230.

Returning to FIG. 5, at a next step 503, the server 230 determines if the buyer is going to participate in a pool buy. In the process of decision block 503, the server 230 provides an option in a Web page that allows the buyer to post their Line Item data to a vendor or post their Line Item data to a buyer pool. The window illustrated in FIG. 8A is one exemplary Web page illustrating these options for a buyer. As shown in FIG. 8A, the links "Post Buyer Pool" 812 and "Post to Vendors" 814 are provided on the RFQ Web page.

At step 503, if the buyer does not elect to participate in a pool buy, the process continues to step 513 where the server 230 generates a request for a quote (RFQ) from the buyer's Line Item data. A detailed description of how the server 230 generates a request for a quote (RFQ) is summarized below and referred to as the purchase order process 600A depicted in FIG. 6A.

Alternatively, at decision block 503, if the buyer elects to participate in a pool buy, the process continues to step 505 where the system notifies other buyers logged into the server 230 that an RFQ is available in a pool, allowing other buyers to add additional Line Items (tallies) to the RFQ. In this part of the process, the Line Items from each buyer are received by and stored in the server memory. The Line Items provided by each buyer in the pool are received by the server 230 using the same process as described above with reference to block 501 and the Web page of FIG. 8A. All of the Line Items stored on the server 230 are then displayed to a pool administrator via a Web page or an e-mail message. In one embodiment, the pool administrator is one of the buyers in a pool where the pool administrator has the capability to select all of the Line Item data to generate a combined RFQ. The server 230 provides the pool administrator with this capability by the use of any Web-based communicative device, such as e-mail or HTML forms. As part of the process, as shown in steps 507 and 509, the pool may be left open for a predetermined period of time to allow additional buyers to add purchase data to the current RFQ.

At decision block 509, the server 230 determines if the pool administrator has closed the pool. The logic of this step 509 is executed when the server 230 receives the combined RFQ data from the pool administrator. The pool administrator can send the combined RFQ data to the server 230 via an HTML form or by other electronic messaging means such as e-mail or URL strings. Once the server 230 has determined that the pool is closed, the process continues to block 510 where the Line Items from each buyer (the combined RFQ) are sent to all of the buyers in the pool. The process then continues to step 513 where the server 230 sends the combined RFQ to the vendors or sellers.

Figure 6A:
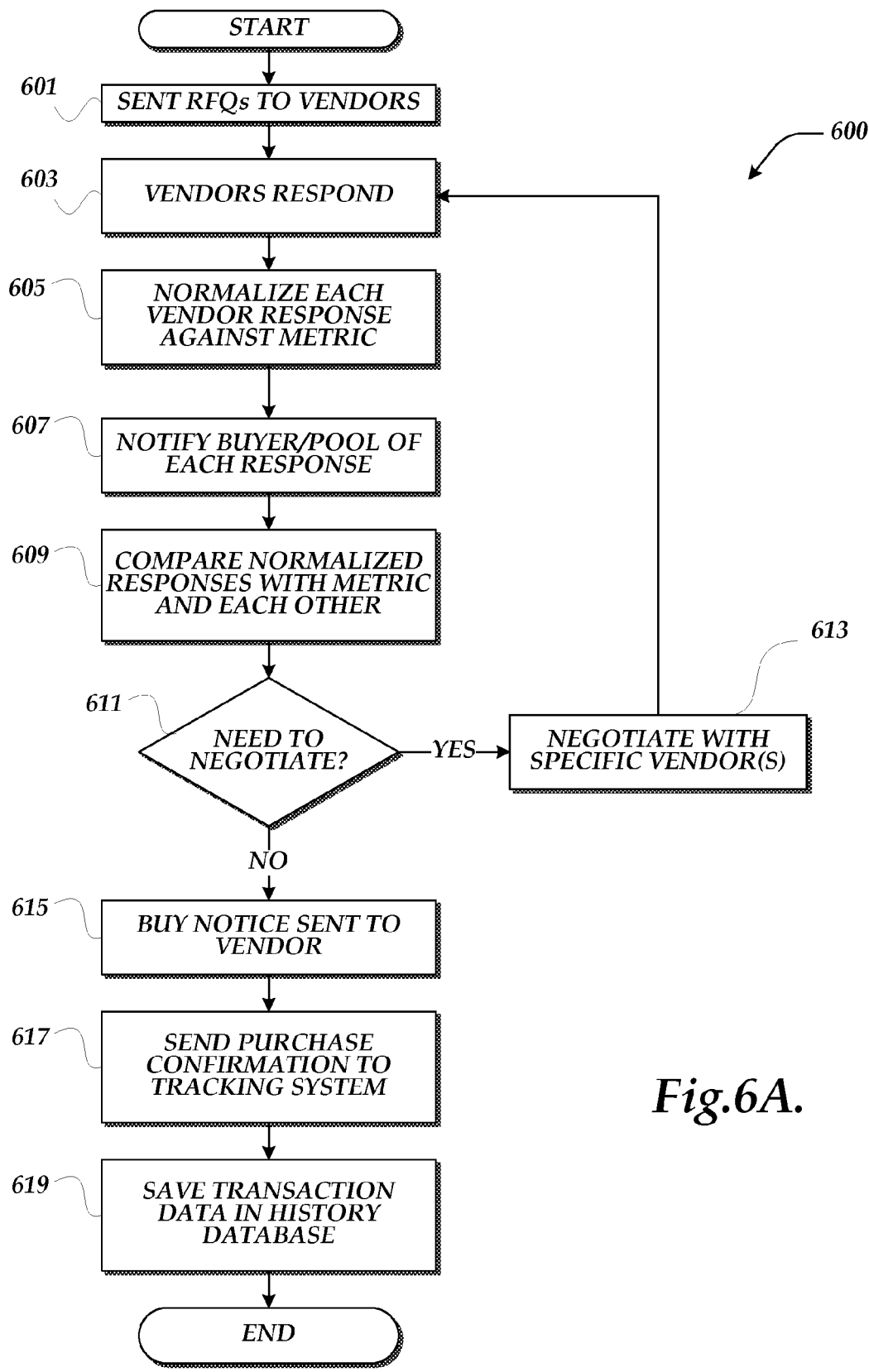
FIGS. 6A-6B are flow diagrams illustrating another embodiment of the logic used by the information server to receive and process the quotes and quote requests of both buyers and vendors.

Referring now to FIG. 6A, one embodiment of the purchase-negotiation process 600 is disclosed. The purchase-negotiation process 600 is also referred to as a solicited offer process or the market purchase process. In summary, the purchase-negotiation process 600 allows at least one buyer to submit an RFQ and then view quotes from a plurality of vendors and purchase items from selected vendor(s). The logic of FIG. 6A provides buyers with a forum that automatically manages, collects, and normalizes the price of desired commodity items. The purchase-negotiation process 600 calculates a normalized price data set that is based on a predefined metric(s). The calculation of the normalized price data set in combination with the format of the Web pages described herein create an integrated forum where quotes for a plurality of inherently dissimilar products can be easily obtained and compared.

The purchase-negotiation process 600 begins at step 601 where the RFQ, as generated by one buyer or a pool of buyers in the process depicted in FIG. 5, is sent to a plurality of computing devices 250 associated with a plurality of sellers or vendors. The vendors receive the RFQ via a Web page transmitted by the server 230. In one embodiment, the vendors receive an e-mail message having a hypertext link to the RFQ Web page to provide notice to the vendor. Responsive to the information in the buyers' RFQ, the process then continues to step 603 where at least one vendor sends their quote information to the server 230.

In the process of step 603, the vendors respond to the RFQ by sending their price quote to the server 230 for display via a Web page to the buyer or buyer pool. Generally described, the vendors send an HTML form or an e-mail message with a price and description of the order. The description of the order in the quote message contains the same order information as the RFQ.

Figure 8B:
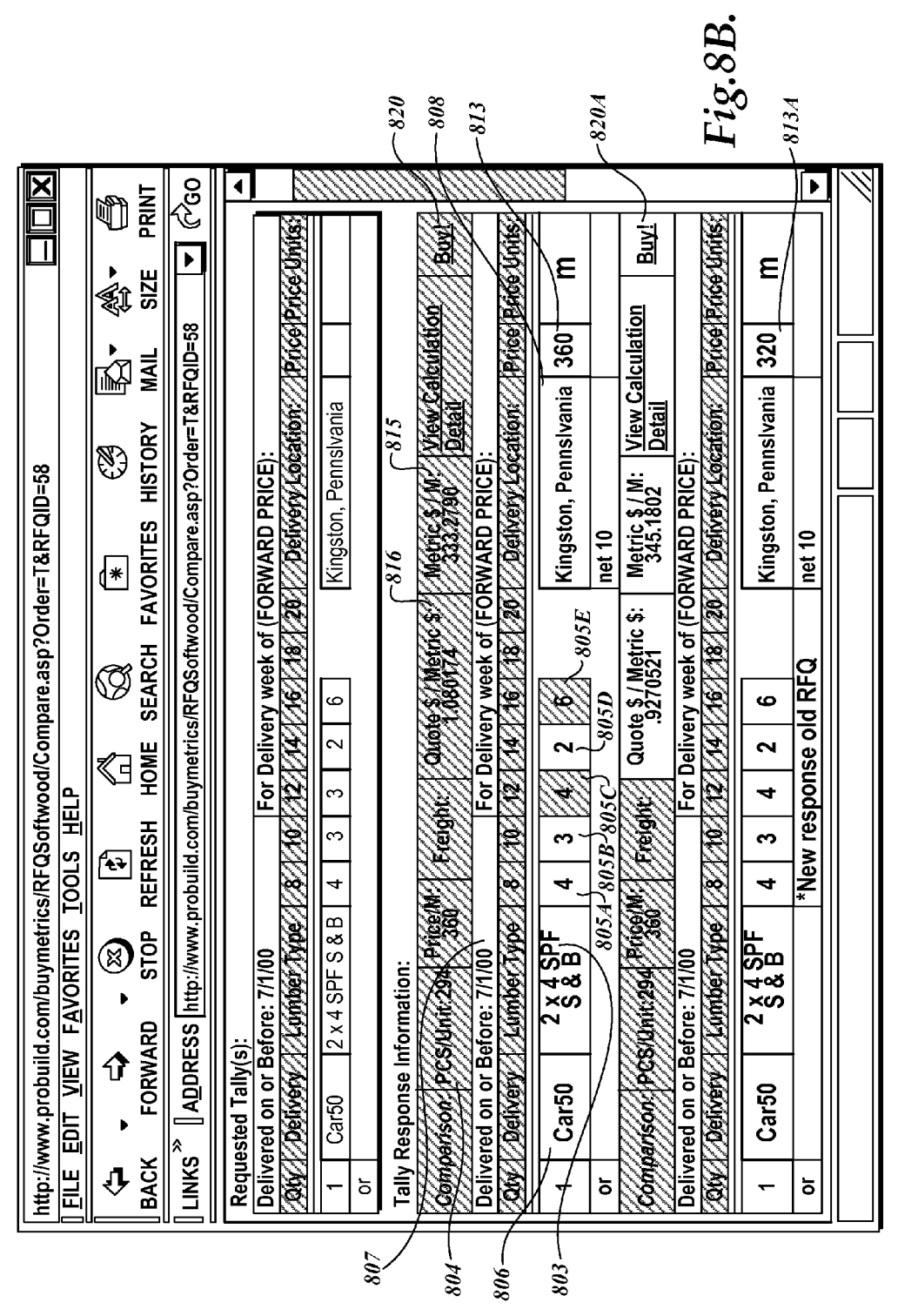

FIG. 8B illustrates one exemplary Web page of a vendor quote that is displayed to the buyer. As shown in FIG. 8B, the vendor quote includes the vendor's price 813, the lumber species and grade 803, number of pieces per unit 804, quantities of the various units comprising the preferred assortment in the tally 805A-E, delivery method 806, delivery date 807, and delivery location 808. In the quote response message, the vendor has the capability to modify any of the information that was submitted in the RFQ. For example, the vendor may edit the quantity values for the various units comprising the preferred assortment in the tally 805A-E. This allows the vendor to adjust the buyer's request according to the vendor's inventory, best means of transportation, etc. All of the vendor's quote information is referred to as price data set or the RFQ Line Item (tally) quote.

Returning to FIG. 6A, the process continues to step 605, where the server 230 normalizes the price of each RFQ Line Item (tally) quote from each vendor. The normalization of the vendor's price is a computation that evaluates the vendor's price utilizing data from a metric. The normalization process is carried out because each vendor may respond to the Line Items of an RFQ by quoting products that are different from a buyer's RFQ and/or have a different tally configuration. The normalization of the pricing allows the buyers to objectively compare the relative value of the different products offered by the plurality of vendors. For example, one vendor may produce a quote for an RFQ of one unit of 2×4×10, two units of 2×4×12, and three units of 2×4×16. At the same time, another vendor may submit a quote for three units of 2×4×10, one unit of 2×4×12, and two units of 2×4×16. Even though there is some difference between these two offerings, the price normalization process provides a means for the buyer to effectively compare and evaluate the different quotes even though there are variations in the products. The price normalization process 900 is described in more detail below in conjunction with the flow diagram of FIG. 9.

Returning again to FIG. 6A, at step 607 the vendor's quote information is communicated to the buyer's computer for display. As shown in FIG. 8B and described in detail above, the vendor's quote is displayed via a Web page that communicates the vendor's quote price 813 and other purchase information. In addition, the vendor's quote page contains a metric price 815 and a quote price versus metric price ratio 816. The metric price 815 and the quote price versus metric price ratio 816 are also referred to as a normalized price data value. A ratio higher than one (1) indicates a quote price that is above the metric price, and a lower ratio indicates a quote price that is below the metric price.

Next, at step 609, the buyer or the administrator of the buyer pool compares the various products and prices quoted by the vendors along with the normalized price for each Line Item on the RFQ. In this part of the process, the buyer may decide to purchase one of the products from a particular vendor and sends a notification to the selected vendor indicating the same. The buyer notifies the selected vendor by the use of an electronic means via the server 230, such as an HTML form, a chat window, e-mail, etc. For example, the quote Web page depicted in FIG. 8B shows two different quotes with two different tallies, the first quote price 813 of $360, and the second quote price 813A of $320. If the buyer determines that they prefer to purchase the materials listed in the first quote, the buyer selects the "Buy!" hyperlink 820 or 820A associated with the desired tally.

If the buyer is not satisfied with any of the listed vendor quotes, the server 230 allows the buyer to further negotiate with one or more of the vendors to obtain a new quote. This step is shown in decision block 611, where the buyer makes the determination to either accept a quoted price or proceed to step 613 where they negotiate with the vendor to obtain another quote or present a counter-offer. Here, the server 230 provides a graphical user interface configured to allow the buyer and one vendor to electronically communicate, using, e.g., a chat window, streaming voice communications, or other standard methods of communication. There are many forms of electronic communications known in the art that can be used to allow the buyer and vendors to communicate.

The buyer and seller negotiate various quotes and iterate through several steps 603-613 directed by the server 230, where each quote is normalized, compared, and further negotiated until a quote is accepted by the buyer or negotiations cease. While the buyer and seller negotiate the various quotes, the server 230 stores each quote until the two parties agree on a price. At any step during the negotiation process, the system always presents the buyer with an option to terminate the negotiation if dissatisfied with the quote(s).

At decision block 611, when a buyer agrees on a quoted price, the process then continues to step 615 where the buyer sends a notification message to the vendor indicating they have accepted a quote. As described above with reference to steps 603-613, the buyer notification message of step 615 may be in the form of a message on a chat window, e-mail, by an HTML form, or the like. However, the buyer notification must be transmitted in a format that allows the system to record the transaction. The buyer notification may include all of the information regarding the specifications by RFQ Line Item, such as, but not limited to, the buy price, date, and method of shipment, and payment terms.

The purchase-negotiation process 600 is then finalized when the system, as shown in step 617, sends a confirmation message to a tracking system. The confirmation message includes all of the information related to the agreed sales transaction.

Optionally, the process includes step 619, where the server 230 stores all of the information related to RFQ, offers, and the final sales transaction in a historical database. This would allow the server 230 to use all of the transaction information in an analysis process for providing an improved method of obtaining a lower market price in future transactions and in identifying optimum purchasing strategy. The analysis process is described in further detail below. Although the illustrated embodiment is configured to store the data related to the sales transactions, the system can also be configured to store all of the iterative quote information exchanged between the buyer and vendor.

Figure 6B:
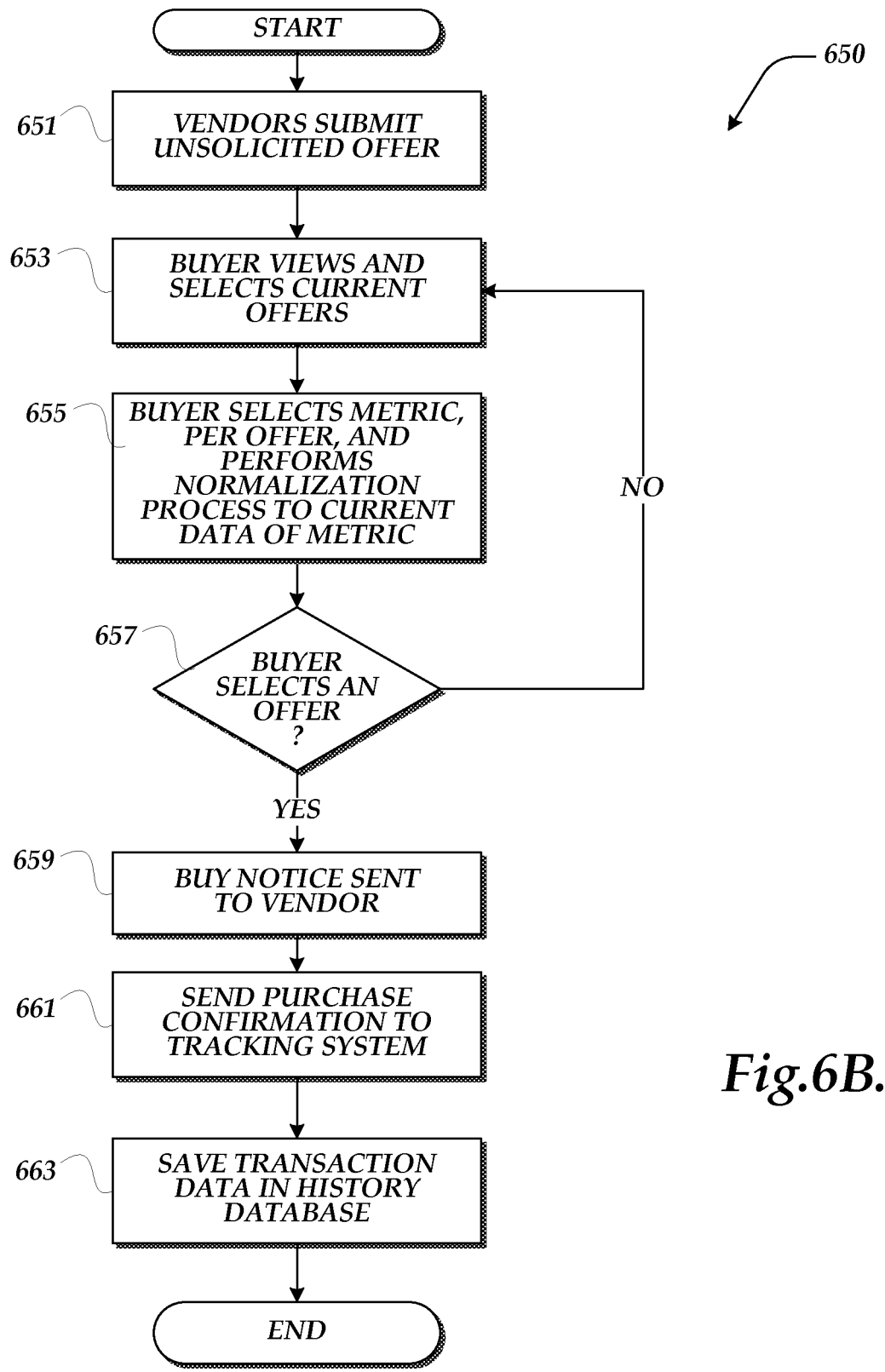

Referring now to FIG. 6B, an embodiment of the unsolicited offer process 650 is disclosed. In summary, the unsolicited offer process 650, also referred to as the unsolicited market purchase process, allows at least one buyer to view unsolicited offers from a plurality of vendors and purchase items from a plurality of vendors from the offers. The logic of FIG. 6B provides buyers with a forum that automatically manages, collects, and normalizes price quotes based on metric data. By the price normalization method of FIG. 6B, the server 230 creates an integrated forum where offers from a plurality of inherently dissimilar products can be obtained and normalized for determination of purchase.

The unsolicited offer process 650 begins at step 651 where the plurality of vendors is able to submit offers to the server 230. This part of the process is executed in a manner similar to step 603 of FIG. 6A, where the vendor submits a quote to the server 230. However, in the Web page of step 651, the server 230 generates a Web page containing several tallies from many different vendors. In addition, at step 651, the server 230 stores all of the unsolicited offer data provided by the vendors.

Next, at step 653, a buyer views the offers stored on the server 230. This part of the process is carried out in a manner similar to the process of step 603 or 607 where the server 230 displays a plurality of offers similar to the tallies depicted in FIG. 8A.

Next, at step 655, the buyer selects a metric for the calculation of the normalized price associated with the selected offer. As described in more detail below, metric data may come from publicly available information, i.e., price of futures contracts traded on the Chicago Mercantile Exchange, subscription services such as Crowes™ or Random Lengths™ accessed via the metric server adapter 435 (shown in FIG. 4), or internally generated metrics derived from the data stored in the server 230. The normalization calculation, otherwise referred to as the normalization process, occurs each time the buyer views a different offer, and the normalization calculation uses the most current metric data for each calculation. The normalization process is carried out because each vendor will most likely offer products that may vary from products of other vendors and have a different tally configuration from those supplied by other vendors. The normalization of the pricing allows the buyers to compare the relative value of the different products offered by the number of vendors. The metric price for each selected offer is displayed in a similar manner as the metric price 815 and 816 shown in the Web page of FIG. 8B.

Next, at decision block 657, the buyer selects at least one offer for purchase. This is similar to the process of FIG. 6A in that the buyer selects the "Buy!" hyperlink 820 associated with the desired tally to purchase an order. The process then continues to steps 659-663, where, at step 659, the process transmits a buy notice to the vendor, then, at step 661, sends a purchase confirmation to the tracking system, and then, at step 663, saves the transaction data in the server database. The steps 659-663 are carried out in the same manner as the steps 615-619 of FIG. 6A. In the above-described process, the buyer notification may include all of the information regarding the specifications by RFQ Line Item, and data such as, but not limited to, the buy price, date, and method of shipment, and the payment terms.

Figure 7:
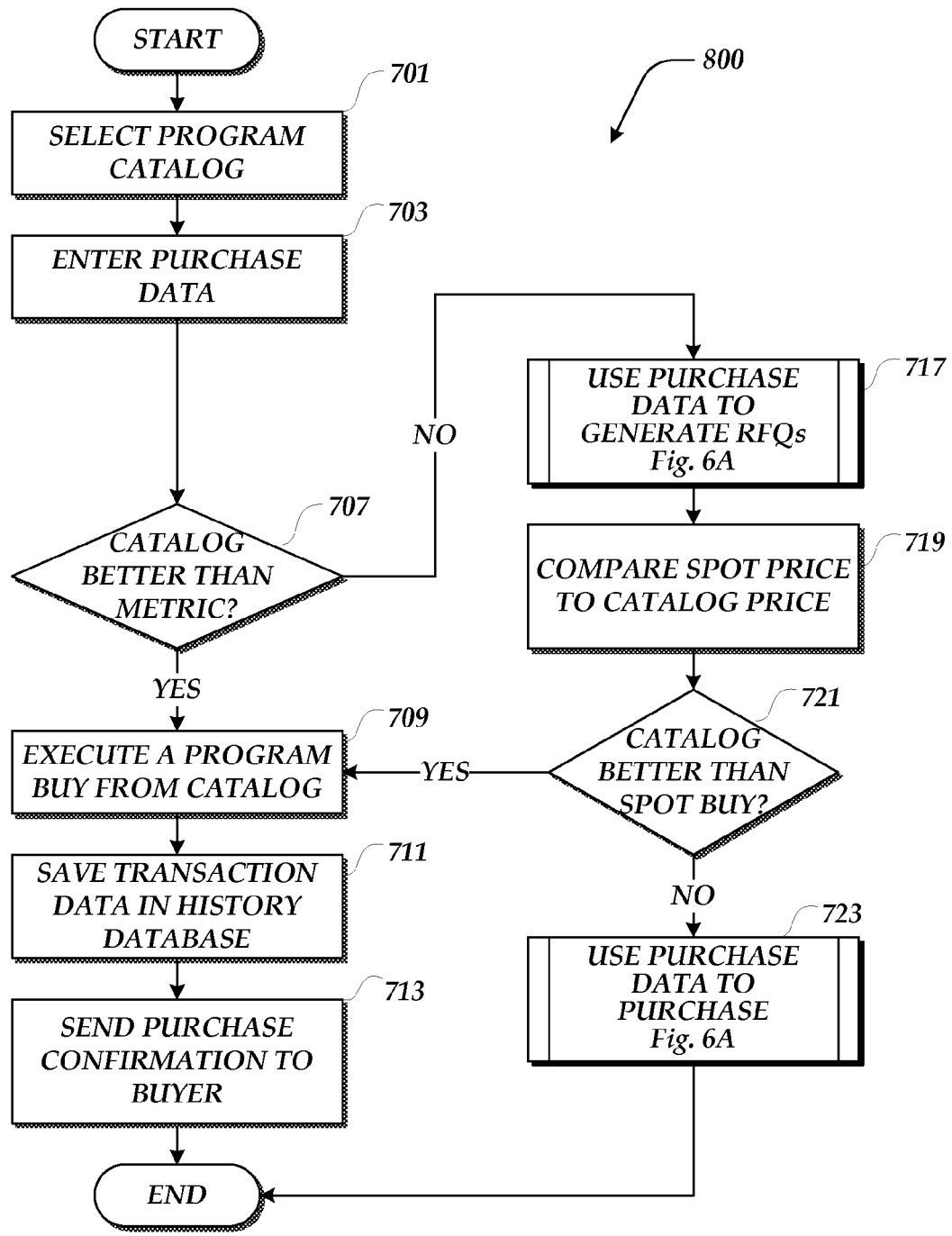
FIG. 7 is a flow diagram illustrating another embodiment of the logic used by the information server to execute the process of a catalog purchase.

Referring now to FIG. 7, a flow diagram illustrating yet another embodiment of the present disclosure is shown. FIG. 7 illustrates the catalog purchase process 700. This embodiment allows buyers to search for a catalog price of desired commerce items, enter their purchase data based on the pre-negotiated catalog prices, and to compare those catalog prices with a selected metric price and the current market price, wherein the current market price is determined by the purchase-negotiation process 600.

The process starts at step 701 where the buyer selects a program buy catalog 443. The program buy catalog 443 provides buyers with the published or pre-negotiated price of the desired products. Next, at step 703, based on the catalog information, the buyer then enters their purchase data. Similar to step 501 of FIG. 5 and the tally shown in FIG. 8A, the buyer sends purchase data to the server 230, such as the desired quantity of each item and the lumber species, grade, etc.

The process then proceeds to decision block 707 where the buyer makes a determination of whether to purchase the items using the catalog price or purchase the desired product in the open market. Here, the server 230 allows the user to make this determination by displaying the metric price of each catalog price. This format is similar to the metric price 815 and 816 displayed in FIG. 8B.

At decision block 707, if the buyer determines that the catalog price is better than a selected metric price, the process then proceeds to steps 709, 711, and 713, where a program buy from the catalog is executed, and the buyer's purchase information is stored on the server 230 and sent to the vendor's system to confirm the sale. These steps 711-713 are carried out in the same manner as the confirmation and save steps 617 and 619 as shown in FIG. 6A.

At decision block 707, if the buyer determines that the metric price is better than the catalog price, the process continues to step 717 where the buyer's purchase data is entered into an RFQ. At this step, the process carries out the first five steps 601-609 of the method of FIG. 6A to provide buyers with the price data from the open market, as well as provide the normalized prices for each open market quote. At step 719, the server 230 then displays a Web page that allows the user to select from a purchase option of a catalog or spot (market) purchase. At decision block 721, based on the displayed information, the buyer will then have an opportunity to make a determination of whether they will proceed with a catalog purchase or an open market purchase.

At decision block 721, if the buyer proceeds with the catalog purchase, the process continues to step 709 where the catalog purchase is executed. Steps 709-713 used to carry out the catalog purchase are the same as if the buyer had selected the catalog purchase in step 707. However, if at decision block 721 the buyer selects the option to proceed with the market purchase, the process continues to step 723 where the RFQ generated in step 717 is sent to the vendor. Here, the process carries out the steps of FIG. 6 to complete the open market purchase. More specifically, the process continues to step 609 where the buyer compares the normalized prices from each vendor. Once a vendor is selected, the negotiation process of steps 603-613 is carried out until the buyer decides to execute the purchase. Next, the transaction steps 615-619 are carried out to confirm the purchase, notify the tracking system, and save the transactional data on the historical database.

Optionally, the process can include a step where the server 230 stores all of the information related to program buy and metric comparisons and the final sales transaction in a historical database. This would allow the server 230 to use all of the transaction information in an analysis process for providing an improved method of obtaining the value of the program. Although the illustrated embodiment is configured to store the data related to the sales transactions, the system can also be configured to store all of the iterative quote information exchanged between the buyer and vendor.

The analysis process allows the server 230 to utilize the sales history records stored in steps 619 and 711 to generate price reports for communication to various third parties as well as provide a means of calculating current market prices for products sold in the above-described methods. The sales history records are also used as the source for a metric, such as those used in the process of FIGS. 6A, 6B, and 7. As shown in steps 619, 663, and 711, the server 230 continually updates the historical database for each sales transaction. The analysis reporting process allows a buyer or manager of buyers to conduct analysis on the historical information. This analysis would include multi-value cross compilation for purposes of determining purchasing strategies, buyer effectiveness, program performance, vendor performance, and measuring effectiveness of forward pricing as a risk management strategy.

Figure 9:
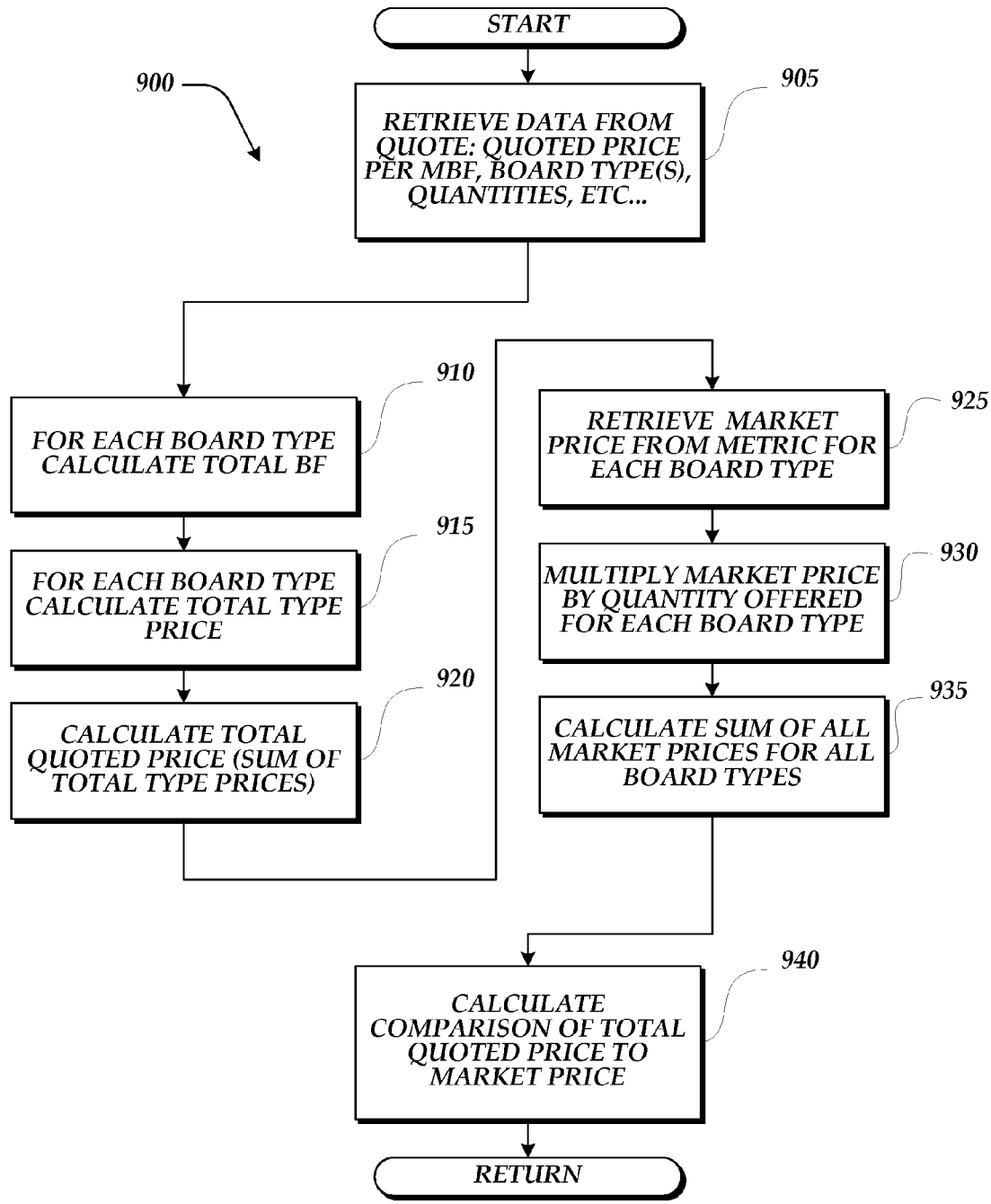
FIG. 9 is a flow diagram illustrating one embodiment of the normalization process described herein.

Referring now to FIG. 9, a flow diagram illustrating the logic of the normalization process 900 is shown. The logic of the normalization process 900 resides on the server 230 and processes the quotes received from commodity sellers. The logic begins at step 905 where quote data is obtained from the seller in response to the buyer's RFQ as described above.

Next, at step 910, routine 900 iteratively calculates the board footage (BF) of each type of lumber. Once all the totals are calculated for each type, routine 900 continues to step 915 where the server 230 calculates the total type price.

At step 915, routine 900 iteratively calculates the total type price for the amount of each type of lumber specified in the quote. This is accomplished by taking the total board footage (BF) calculated in block 910 and multiplying the total BF by the price per MBF specified in the quote. Once all the prices are calculated for each type, routine 900 continues to step 920 where the server 230 calculates the total quoted price. At step 920, the routine 900 calculates the total price for the quote by summing all of the total type prices calculated at step 915.

At step 925, routine 900 iteratively retrieves the most current price for each type of lumber specified in the quote from a predefined metric source(s). Metric data may come from publicly available information, i.e., price of futures contracts traded on the Chicago Mercantile Exchange, subscription service publications such as Crowes™ or Random Lengths™ accessed via the metric server adapter 435 (shown in FIG. 4), or internally generated metrics derived from the server database. Once all the prices are retrieved for each type, at step 930, the routine 900 then iteratively calculates the market price for the quantity of each type of lumber in the quote. Once the totals for all types are calculated, routine 900 continues to step 935 where the routine 900 calculates the total market price for the quote by summing all the most current prices calculated in step 930. Although this example illustrates that steps 910-920 are executed before steps 925-935, these two groups of steps can be executed in any order, or in parallel, so long as they are both executed before a comparison step 940.

At step 940, routine 900 compares the total quoted to the metric price to arrive at a comparative value. In one exemplary embodiment of the current invention, the comparative value is a "percent of metric" value. A value higher than one hundred (100) percent indicates a price that is above the metric rate, and a lower percent indicates a price that is below the metric rate.

The operation of routine 900 can be further illustrated through an example utilizing specific exemplary data. In the example, a buyer sends out a request for a quote (RFQ) requesting a lot of 2×4 S&B lumber consisting of five units of 2"×4"×8', two units of 2"×4"×14', and five units of 2"×4"×16'. The buyer then receives quotes from three sellers. Seller A responds with a tally of six units of 2"×4"×8', four units of 2"×4"×14', and three units of 2"×4"×16' for $287 per thousand board feet. Seller B responds with a lot of five units of 2"×4"×8', one unit of 2"×4"×14', and six units of 2"×4"×16' for $283 per thousand board feet. Seller C responds with a lot of one unit of 2"×4"×8', five units of 2"×4"×14', and five units of 2"×4"×16' for $282 per thousand board feet. Suppose also that the typical unit size is 294 pieces/unit, and the metric or reported market price for 2"×4"×8's is $287.50, for 2"×4"×14's is $278.50, and for 2"×4"×16' is $288.

Viewing the MBF prices for the respective quotes is not particularly informative, given that certain lengths of lumber are more desirable and priced accordingly in the marketplace. By processing the quote from Seller A using routine 900, we arrive at a total MBF of 29.792, giving a total quoted price of $8,550.30. The selected metric price for the same types and quantities of lumber would be $8,471.12; therefore, the quoted price would have a percent of market value of 100.93%. Processing the quote from Seller B using routine 900, we arrive at a total MBF of 29.400, giving a total quoted price of $8,320.20. The selected metric price for the same types and quantities of lumber, however, would be $8,437.21; therefore, the quoted price would have a percent of market value of 98.61%. Finally, processing the quote from Seller C using routine 900, we arrive at a total MBF of 30.968, giving a total quoted price of $8,732.98. The selected metric price for the same types and quantities of lumber, however, would be $8,767.66; therefore, the quoted price would have a percent of market value of 99.38%. By looking at the percent of selected metric value, it is apparent that the price from Seller B is a better value. As shown in the methods of FIGS. 5-7, this price normalization process allows users to compare inherently different offers having different quality and quantity values.

In yet another example of an application of the normalization process, additional exemplary data is used to demonstrate the analysis of a transaction having one RFQ from a buyer and two different quotes from a seller, normalized to comparable product of another species. In this example, the buyer produces an RFQ listing the following items: one carload of Eastern SPF (ESPF) lumber having four units of 2"×4"×8', four units of 2"×4"×10', six units of 2"×4"×12', two units of 2"×4"×14', and six units of 2"×4"×16'. The vendor then responds with two different quotes with two different unit tallies and two different prices. The first response lists a quote price of $320 per thousand board feet, and a slight modification of the tally provides four units of 2"×4"×8', four units of 2"×4"×10', six units of 2"×4"×12', three units of 2"×4"×14', and five units of 2"×4"×16'. The second response quotes per the requested tally at a price of $322 per thousand board feet. Both quotes list the delivery location as "Chicago."

Figure 8C:
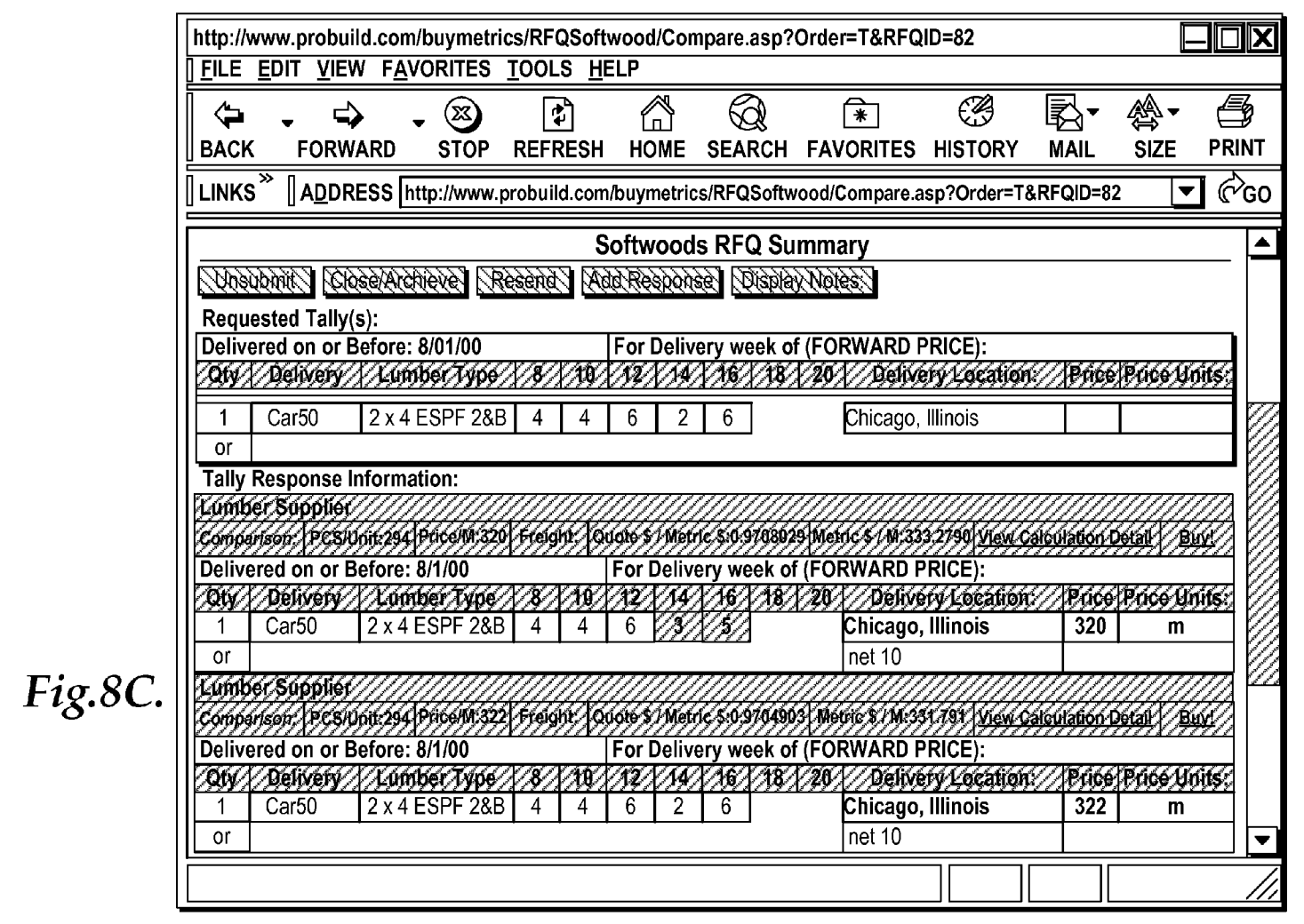

To display the quotes, the server 230 produces a Web page similar to that displayed in FIG. 8C, where the vendor's modified tally is displayed in highlighted text. The buyer can then view summary metric comparison or select the hypertext link "View Calculation Detail," which then invokes the server 230 to produce a Web page as shown in FIG. 8D. Referring now to the Web page illustrated in FIG. 8D, the data produced by server 230 compares the response to a selected metric of a different species, Western SPF (WSPF), for items of the same size, grade, and tally. The market price for the same 2×4 tally of ESPF and WSPF are thus simultaneously compared. In an example, Eastern quoted at $322 per thousand board feet, Western metric (Random Lengths™ Jun. 26, 2000 print price plus freight of $80 as defined in Metric Manager) for the same tally being $331.791. This metric comparison is also represented as Quote/Metric Value or Eastern price representing 0.970490, or 97% of comparable Western product.

In review of the normalization process, the buyer must select a metric source for price information for a defined item given a set of attributes, i.e., grade, species, and size. The metric may then be mapped to the RFQ item for comparison and does not have to be the equivalent of the item. For instance, as explained in the above-described example, it may be desirable to map the market relationship of one commodity item to another. The most current pricing data for the metric is electronically moved from the selected source to the server 230. As mentioned above, metric data may come from publicly available information, (i.e., price of futures contracts traded on the Chicago Mercantile Exchange), or subscription services, (i.e., Crowes™ or Random Lengths™ publications), or be an internal metric generated by the server 230. This metric data is used in the normalization process for all calculations, as described with reference to the above-described methods.

While various embodiments of the invention have been illustrated and described, it will be appreciated that within the scope of the appended claims, various changes can be made therein without departing from the spirit of the invention. For example, in an agricultural commodity, an order for Wheat U.S. #2 HRW could be compared to a selected metric of Wheat U.S. #2 Soft White, similar to how different species are analyzed in the above-described example.

The above system and method can be used to purchase other commodity items, such as in the trade of livestock. In such a variation, order information such as a lumber tally would be substituted for a meat type, grade, and cut. Other examples of commodity items include agricultural products, metals, or any other items of commerce having several order parameters.

The invention claimed is:
1. In a networked service provider environment usable via system-managed user interfaces, a system having a governing logic application for managing market reference data that operates independently from, yet in coordination with, a separate production application, the system comprising:
a remotely-located service provider server comprising:
a network interface;
a non-transitory computer-readable medium having computer-executable instructions stored thereon, wherein the computer-executable instructions, when executed, implement a plurality of applications including:
a metric server adapter; and
a metrics application; and
a processor in communication with the network interface and the computer-readable medium, wherein the processor is configured to execute the computer-executable instructions stored in the computer-readable medium;
wherein:
the metric server adapter is a governing logic application programmed to autonomously manage at least one evaluation service and a plurality of predefined instructions for managing metric data, including a user-agent's customized instructions or industry-specific instructions, to dynamically define transaction-specific instructions for adapting metric data, and to coordinate a conditional execution of transaction-specific instructions for adapting metric data by the metrics application, wherein one or more of the predefined instructions are preassociated with attributes predefined for an item and/or one or more parameter values, the parameter values representing attributes or conditions that are variable for specific items or transactions, and wherein the predefined instructions are stored in a memory accessible to the service provider server;
the metrics application is a production application programmed to control invocation of the at least one evaluation service and, in coordination with the metric server adapter, to conditionally execute one or more transaction-specific instructions for adapting metric data and generate one or more evaluation metrics that pertain to a user-agent and the at least one evaluation service, and to manage one or more user interfaces that facilitate communications with the remotely-located service provider server, and
in operation, in response to receiving a triggering request from a user-agent controlled computing device, the metrics application provides at least one user interface that identifies the user-agent initiating the at least one evaluation service, and configures the service provider server to:
receive, from the user-agent controlled computing device, via a system-managed user interface, one or more product specification data sets, wherein each product specification data set identifies at least one item that is defined by a plurality of attributes having attribute data that includes two or more parameter values, or identifies a plurality of items defined by a plurality of attributes that differ in accordance with at least one parameter value;
wherein receipt of at least one product specification data set triggers the metrics application to automatically invoke the at least one evaluation service, wherein invoking the at least one evaluation service causes the metrics application to:
obtain metric data from at least one data source accessible to the service provider server for each product specification data set, wherein the obtained metric data represents market reference data for at least one item having attributes that are responsive to attributes of the at least one item as identified in the product specification data set, and wherein each responsive item in the market reference data is defined by a plurality of attributes having attribute data that includes at least one parameter value and represents market reference price data for the one or more responsive items at a current time or period of time;
evaluate the plurality of attributes defined for each responsive item in the metric data relative to the plurality of attributes for the respective item as identified in the product specification data set to dynamically discover relations within the attribute data, wherein discovery of one or more relationships comprising a difference in the attribute data triggers an automatic disclosure of the one or more relationships to the metric server adapter, wherein the discovered relationships enable the metric server adapter to contextually determine which of the predefined instructions that pertain to the user-agent and the at least one evaluation service are applicable to the responsive item in the metric data, wherein the metric server adapter uses the attributes and one or more parameter values identified for the respective item in the product specification data set with the predefined instructions determined to be applicable to the responsive item in the metric data to dynamically define transaction-specific instructions for adapting the metric data for the respective item;
normalize the metric data by conditionally executing, in coordination with the metric server adapter, the transaction-specific instructions for adapting metric data as defined for each responsive item in the metric data for the respective item, wherein execution of at least one transaction-specific instruction causes one or more adjustment values to be generated and applied to the market reference price data for at least one responsive item that differs by at least one parameter value from the respective item identified in the product specification data set, transforming the current market reference price data for the at least one responsive item and automatically producing one or more transaction-specific market reference price data values for the respective item as identified in the product specification data set; and
generate one or more evaluation metrics that pertain to the user-agent and the at least one evaluation service for the at least one item as identified in each product specification data set, wherein each evaluation metric is based, at least in part, on the one or more transaction-specific market reference data values produced for the respective item as identified in the product specification data set; and
wherein the metrics application is further programmed to manage at least one user interface that, in operation, triggers an event, via the network interface, which causes the user-agent controlled computing device to be activated and configured for a data exchange, and con- figures the remotely-located service provider server to communicate, via the network interface, one or more of the received product specification data sets and the one or more evaluation metrics generated for at least one item as identified in each communicated product specification data set, and to execute movement of the data to at least the user-agent controlled computing device from which the one or more product specification data sets were received.

2. The system of claim 1, wherein the metrics application is separate from the metric server adapter, and wherein coordinated operation of the metrics application with the metric server adapter enables the metrics application to algorithmically process the attribute data to dynamically identify at least one relationship comprising a difference within the attribute data, including a new or previously unknown relationship, and to produce the one or more transaction-specific market reference price data values, in coordination with the metric server adapter, without relying on a pre-constructed model having a predefined relationship that remains fixed within the model and outputs predictable results.

3. The system of claim 1, wherein invocation of the at least one evaluation service and/or execution of one or more transaction-specific instructions causes the metric data to be obtained from two or more different data sources.

4. The system of claim 1, wherein invocation of the at least one evaluation service and/or execution of one or more transaction-specific instructions causes the metrics application to obtain metric data comprising a plurality of previously-exchanged market transaction data sets, wherein each market transaction data set represents data that was exposed by at least one buyer-agent or at least one seller-agent.

5. The system of claim 1, wherein the parameter values represent variable attributes including a grade, a rating measure, a species, an item type, a brand, a quantity, a size, a unit of measure, a tally, a location, a method of delivery, a delivery date, a time of service, a warranty, a payment term, or a transaction type.

6. The system of claim 5, wherein delivery comprises a financial delivery.

7. The system of claim 5, wherein the delivery date or time of service specifies one or more fulfillment dates in the future, and comprises a forward price transaction type.

8. The system of claim 1, wherein at least one received product specification data set identifies a bundle of items defined by a plurality of attributes having attribute data that differs by at least one parameter value or wherein at least one item identified in at least one product specification data set is a combined item that represents a packaged product or transaction, a tally, or an assembly of one or more component parts, wherein each component part is defined by a plurality of attributes having attribute data that differs by at least one parameter value.

9. The system of claim 8, wherein at least one combined item identified in a product specification data set comprises a packaged set of transactions, wherein each of transaction in the packaged set of transactions includes at least one item that is defined by a plurality of attributes having attribute data that includes two or more parameter values, or a plurality of items defined by a plurality of attributes that differ in accordance with at least one parameter value.

10. The system of claim 8, wherein at least one product specification data set includes a plurality of items or component parts that were identified by two or more different user-agents and combined into a single product specification data set, and wherein each item or component part of the combined product specification data set is only offered in combination with all other items or component parts in the combined product specification data set.

11. The system of claim 1, wherein invocation of the at least one evaluation service and/or execution of one or more transaction-specific instructions causes the metrics application to generate at least one evaluation metric, wherein price data associated with the at least one item identified in a received product specification data set is divided by the at least one transaction-specific market reference price data value produced for the at least one item, to generate a relative value metric comprising a ratio or index value.

12. The system of claim 11, further comprising receiving a plurality of product specification data sets, wherein the relative value metric is a measure of the item's price in relation to a transaction-specific market reference price data value produced for the at least one item as identified in each product specification data set, and wherein communication of the relative value metric generated for the at least one item as identified in each product specification data set provides the user-agent with an objective measure with which to compare the at least one item across the plurality of product specification data sets, including one or more product specification data sets wherein the at least one item differs by at least one parameter value.

13. The system of claim 12, wherein a product specification data set with the lowest relative value metric generated for the at least one item in the plurality of product specification data sets is communicated in a first or top position.

14. The system of claim 1, wherein invocation of the at least one evaluation service and/or execution of at least one transaction-specific instruction causes the metrics application to rank or sort a plurality of product specification data sets by at least one of the one or more evaluation metrics generated for the at least one item as identified in each of the product specification data sets, and causes the metrics application to communicate only a ranked or sorted subset of the identified product specification data sets to the user-agent controlled computing device.

15. The system of claim 14, wherein the user-agent controlled computing device is a mobile device, wherein the number of ranked or sorted product specification data sets communicated to the user-agent controlled computing device is limited to a predefined number or predefined portion of the ranked or sorted product specification data sets for visual display in a constrained display space of the mobile computing device.

16. The system of claim 1, wherein execution of at least one predefined instruction that pertains to the user-agent and the at least one evaluation service causes the metric server adapter to define at least one transaction-specific instruction that, when executed by the metrics application, causes the responsive items in the metric data to be filtered for inclusion or exclusion using one or more predefined control values, criteria, and/or parameter values, before producing the one or more transaction-specific market reference price data values for the at least one item as identified in the product specification data set.

17. The system of claim 1, wherein the metrics application is further programmed to manage at least one user interface that, in operation, configures the service provider server to facilitate data communication in XML format, enabling the metrics application to dynamically change, dynamically route, and/or pre-configure data for movement of the data in an integrated data exchange.

18. The system of claim 1, wherein the at least one evaluation service is predefined and stored in a memory accessible to the service provider server, and wherein the at least one evaluation service is invoked by the metrics application in response to receiving, from a user-agent controlled computing device, a product specification data set identifying at least one item for the at least one evaluation service.

19. The system of claim 18, wherein a plurality of evaluation services are predefined and stored in the memory accessible to the service provider server, and selectively invoked by the metrics application in response to receipt of a product specification data set identifying at least one item for the at least one evaluation service.

20. The system of claim 1, wherein the metrics application is further programmed to manage at least one user interface that, in operation, configures the remotely-located service provider server to facilitate an integrated data exchange, wherein the remotely-located service provider server is configured to receive at least one product specification data set from an application running on a user-agent controlled computing device, via a system managed user interface, wherein receipt of the product specification data set causes the metrics application to invoke the at least one evaluation service and execute one or more transaction-specific instructions that, when executed, causes the metrics application to automatically generate one or more evaluation metrics for the at least one item as identified in the product specification data set, and wherein the metrics application is further programmed to manage at least one user interface that, in operation, configures the remotely-located service provider server to communicate, via a system-managed user interface, the one or more evaluation metrics generated for at least one item as identified in the at least one product specification data set to the application running on the user-agent controlled computing device from which the product specification data set was received, and wherein the integrated data exchange does not include a pre-mapped or pre-structured electronic data interchange (EDI) transmission.

21. The system of claim 20, wherein the one or more evaluation metrics communicated in the integrated data exchange are used by the application running on the user-agent controlled computing device, at least in part, to value or re-value an item's replacement cost for financial accounting or insurance purposes, to update the cost of direct inputs to production, to evaluate a selling price or an offer price, to calculate or re-calculate a selling price or an offer price, to generate a competitive market price comparison, or to forecast a return on inventory or a return on investment (ROI).

22. The system of claim 20, wherein the one or more evaluation metrics communicated in the integrated data exchange are used by the application running on the user-agent controlled computing device, at least in part, to value an over-the-counter (OTC) or off-exchange transaction, a basis trade or a hedge transaction, a forward contract, or to represent, at least in part, a value for:
at least one item underlying an exchange-traded contract, or
one or more items or component parts of an exchange-for-physical (EFP) transaction or an exchange-for-swap transaction (EFS), or an exchange-traded contract executed using an exchange-approved alternate-execution-procedure.

23. The system of claim 20, wherein the one or more user interfaces managed by the metrics application enable the service provider server to dynamically interact with the application running on the user-agent controlled computing device, including causing the application to execute one or more actions to enhance the performance of the application and/or the evaluation service, and wherein the application with which the data is exchanged comprises at least one of a back office system required to issue a purchase order, logistics software providing a scheduler or shipment router, a load building/sizing utility, ERP or SCM software required to obtain requisition/purchase authorization or sales or inventory management, MRP software providing a production planning utility, software supporting a regulatory reporting or certification process including chain of custody or audit documentation, or design software (CAD), or CRM software providing a calendar utility.

24. The system of claim 1, wherein the metrics application is further programmed to manage at least one user interface that, in operation, enables a user-agent computing device to predefine, for exclusive use by the user-agent, at least one instruction for managing metric data or to modify at least one predefined instruction for managing metric data, and further causes the metric server adapter to store the at least one predefined or modified instruction in a memory accessible to the service provider server for retrieval when the at least one evaluation service is invoked by the metrics application in response to receipt of a product specification data set from the user-agent controlled computing device, wherein coordinated operation of the metrics application with the metric server adapter enables the metric server adapter to define transaction-specific instructions for adapting metric data that pertain to the user-agent and the at least one evaluation service, and wherein a conditional execution of the transaction-specific instructions by the metrics application provides an evaluation service that is customized for the user-agent without custom-coding the computer-executable instructions that comprise the metrics application.

25. The system of claim 1, wherein the metrics application is further programmed to manage at least one user interface that, in operation, enables a user-agent computing device to predefine one or more instructions for managing metric data and preassociate the one or more instructions with attributes of an item, parameter, metric data source, vendor, event, and/or one or more other instructions, and to store the predefined and preassociated instructions in a memory for retrieval by the metric server adapter when the at least one evaluation service is invoked by the metrics application in response to receipt of a product specification data set that identifies at least one item from the user-agent controlled computing device.

26. The system of claim 1, wherein the predefined instructions for managing metric data were not predefined for or pre-mapped to a specific transaction.

27. The system of claim 1, wherein one or more predefined instructions for managing metric data that pertain to the user-agent and the at least one evaluation service causes the metric server adapter to define at least one transaction-specific instruction that, when executed by the metrics application, causes the obtained metric data to be evaluated for satisfaction of one or more predefined validation rules and/or statistical criteria and further causes the metrics application to only produce the one or more transaction-specific market reference price data values for the at least one item identified in the product specification data set using market reference data that satisfies the predefined validation rules and/or statistical criteria, or wherein the obtained metric data is to be collectively evaluated for satisfaction of one or more predefined validation rules and/or statistical criteria including at least one of: a total volume in units per item over the particular time or period of time; a measure of the frequency/liquidity of the responsive items in the metric data for a particular time or period of time; a measure of the concentration/fragmentation of the responsive items by a type of transaction; or a measure of the concentration/fragmentation of the responsive items by one or more data sources, and wherein the plurality of responsive items in the metric data are either determined to collectively satisfy the one or more validation rules and/or statistical criteria and are used, or are determined to not collectively satisfy the one or more validation rules and/or statistical criteria and are excluded from use.

28. The system of claim 1, wherein the metric server adapter is programmed to coordinate a conditional execution of transaction-specific instructions for adapting metric data by the metrics application, including:
one or more formulas operationally combining data values and using variables relating to a plurality of items, attributes, parameters, events, or metric data sources; or
a combination of instructions, including statistical criteria and/or validation rules, relating to a plurality of items, attributes, parameters, events, metric data sources, obtained market reference data, transaction-specific market reference price data values or evaluation metrics, the conditional execution of which is priority weighted, sequential, recursive, or subject to another method of control defined by the metric server adapter; or
a combined evaluation service that includes one or more transaction-specific instructions for adapting metric data, wherein at least one transaction-specific instruction is further combined with at least one other transaction-specific instruction that specifies employing a process step, action, function, utility, or subroutine, or wherein at least one evaluation service is combined with at least one other evaluation service, wherein the conditional execution of the combined evaluation service is priority weighted, sequential, recursive, or subject to another method of control defined by the metric server adapter.

29. The system of claim 1, wherein execution of one or more transaction-specific instructions for adapting metric data causes the one or more transaction-specific market reference price data values produced for the at least one item identified in a received product specification data set to be based, at least in part, on a formula, a rule, or a correlation that is applied to the market reference price data of an item with attributes that differ from the at least one item as identified in the product specification data set, wherein the at least one other item is an alternate item or a substitute item that differs by at least one parameter value from the at least one item as identified in the product specification data set.

30. The system of claim 29, wherein at least one user-agent customized instruction preassociates attributes and/or one or more parameter values of the alternate or substitute item with at least one item.

31. The system of claim 1, wherein invocation of the at least one evaluation service and/or execution of one or more transaction-specific instructions causes the metrics application to continuously or over a predetermined period of time obtain current metric data for at least one item having attributes that are responsive to attributes of at least one item as identified in the product specification data set and includes more-current market reference price data for the at least one item or excludes previously-obtained metric data that is no longer responsive to the at least one item or no longer represents market reference price data associated with the at least one item at the current time or period of time, and further causes the metrics application, in coordination with the metric server adapter, to produce one or more more-current transaction-specific market reference price data values for the at least one item and to generate one or more more-current evaluation metrics for the at least one item as identified in the product specification data set.

32. The system of claim 31, wherein at least one user-agent customized instruction for managing metric data causes the metric server adapter to define at least one transaction-specific instruction that, when executed, causes the metrics application to trigger an automatic alert in response to at least one more-current evaluation metric generated for the at least one item exceeding or falling below a trigger value was that predefined for the at least one item by the user-agent, wherein the predefined trigger value is expressed as a numerical value, a percent of change, or a ratio or index value, and wherein the alert is communicated, via a system-managed user interface, to at least the user-agent controlled computing device from which the one or more product specification data sets were received.

33. The system of claim 31, wherein at least one predefined instruction that pertains to the user-agent and the at least one evaluation service causes the metric server adapter to define at least one transaction-specific instruction that, when executed by the metrics application, causes the at least one evaluation metric generated for the at least one item identified in a product specification data set to be automatically updated based, at least in part, on the one or more more-current transaction-specific market reference price data values produced for the at least one item, continuously or in response to occurrence of a predefined event, at a predefined time, or over a predefined interval of time, wherein the predefined interval of time includes a continuously sliding interval of time that represents the most current period of time.

34. The system of claim 31, wherein invocation of the at least one evaluation service and/or execution of one or more transaction-specific instructions causes the metrics application to compare at least one of the one or more evaluation metrics generated for the at least one item to a previously-generated evaluation metric for the at least one item, a predefined base market value, or one or more market values as reported by an exchange or a third-party price reporting service for the at least one item, and further causes the metrics application to manage at least one user interface that, in operation, configures the remotely-located service provider server to communicate a result of the comparison, via the network interface, to at least the user-agent controlled computing device from which the product specification data set was received.

35. The system of claim 1, wherein invocation of the at least one evaluation service and/or execution of one or more transaction-specific instructions causes the metrics application to generate at least one evaluation metric comprising a measure of the value of the difference between at least one of the one or more transaction-specific market reference price data values produced for at least one item identified in the product specification data set and a reported price for an exchange-traded futures contract, wherein attributes of at least one item represented in the exchange-traded futures contract are responsive to attributes of the at least one item as identified in the product specification data set.

36. The system of claim 1, wherein the metrics application is further programmed to manage at least one user interface that, in operation, configures the remotely-located service provider server to facilitate an integrated data exchange between the processor of the remotely-located service provider server and at least one other computing device in communication with the service provider server, and to execute movement of data in an integrated data exchange, via the network interface, wherein the integrated data exchange does not include a pre-mapped or pre-structured electronic data interchange (EDI) transmission.

37. The system of claim 1, wherein the metrics application is further programmed to manage at least one user interface that, in operation, configures the remotely-located service provider server to prompt the user-agent controlled computing device to identify or select at least one data element or function to be added to or removed from a currently in-progress evaluation service, or to provide additional information required by the currently in-progress evaluation service.

38. The system of claim 1, wherein the service provider server is accessible, via one or more system-managed user interfaces, to the user-agent controlled computing device without specialized client application software installed on the user-agent controlled computing device, and wherein the user-agent's predefined instructions and historic data are stored in a memory accessible to the service provider server, enabling a user-agent customized evaluation service and eliminating the need to synchronize the user agent's data across multiple computing devices used by the user-agent.

39. The system of claim 1, wherein at least one computing device in communication with the remotely-located service provider server is a mobile computing device.

40. The system of claim 1, wherein invocation of the at least one evaluation service and/or execution of one or more transaction-specific instructions causes the metrics application to automatically query one or more databases or data sources accessible to the service provider server or to monitor one or more data streams to obtain metric data for one or more items responsive to attributes of the at least one item as identified in a product specification data set.

41. The system of claim 40, wherein invocation of the at least one evaluation service and/or execution of one or more transaction-specific instructions causes the metrics application to query transaction data that was previously aggregated by a tracking system under control of the service provider server to obtain metric data for at least one item having attributes responsive to attributes of the at least one item identified in the product specification data set, wherein the data stored by the tracking system represents market reference data received or generated by the service provider server for a plurality of user-agents, including unaffiliated user-agents, at a particular time or over a period of time.

42. The system of claim 1, wherein the at least one evaluation service and/or one or more predefined instructions that pertain to the user-agent and the at least one evaluation service causes the metric server adapter to define at least one transaction-specific instructions that, when executed, causes the metrics application to generate at least one evaluation metric for at least one item identified in at least one product specification data set under multiple evaluation scenarios, wherein at least one evaluation scenario references an alternate item, alternate parameter, alternate time or period of time, alternate metric data source, or combination thereof, or wherein at least one evaluation scenario causes the metrics application to filter the obtained metric data using one or more control values, criteria, or parameters before producing, in coordination with the metric server adapter, the one or more transaction-specific market reference price data values for the at least one item, wherein the one or more evaluation metrics generated for the at least one item under the multiple evaluation scenarios are compared, and wherein the metrics application is further programmed to manage at least one user interface that, in operation, configures the remotely-located service provider server to communicate a result of the comparison, via the network interface, to at least the user-agent controlled computing device from which the one or more product specification data sets were received.

43. The system of claim 1, wherein the metrics application is further programmed to manage one or more user interfaces that, in operation, configure the remotely-located service provider server to communicate, via a system managed user interface, at least one evaluation metric generated for at least one item as identified in at least one product specification data set to at least the user-agent controlled computing device for visual display, wherein the one or more user interfaces facilitate interactions that cause the metrics application to expose underlying data in one or more layers of detail, to simultaneously display different data in multiple windows, to display linked information, or to display the same data in a different form or from one or more different sources of metric data or as determined at a different time or period of time.

44. The system of claim 1, wherein the at least one evaluation service and/or one or more predefined instructions that pertain to the user-agent and the at least one evaluation service causes the metric server adapter to define at least one transaction-specific instruction that, when executed, causes the metrics application to obtain only metric data resulting from a computer-based interaction and to use only electronically-created metric data to produce the one or more transaction-specific market reference price data values for the respective item as identified in the product specification data set, wherein the electronically-created metric data does not include human-reported transaction data or transaction data that was manually transcribed into a digital format.

45. The system of claim 1, wherein the at least one evaluation service and/or one or more predefined instructions that pertain to the user-agent and the at least one evaluation service causes the metric server adapter to define at least one transaction-specific instruction that, when executed, causes the metrics application to obtain and use only metric data resulting from a purchase or executed contract to generate the one or more evaluation metrics for the at least one item.

46. The system of claim 1, wherein the product specification data set includes a quantity value for each item identified in the product specification data set, and wherein the one or more transaction-specific market reference price data values produced for the respective item as identified in the product specification data set comprises a comparable quantity.

47. The system of claim 1, wherein the at least one evaluation service and/or one or more predefined instructions for managing metric data that pertain to the user-agent and the at least one evaluation service causes the metric server adapter to define at least one transaction-specific instructions that, when executed by the metrics application, causes data expressed in units of measure to be consistently converted into standardized or common units of measure, or units of measure as specified for the at least one item identified in the product specification data set, and further causes the metrics application to only produce, in coordination with the metric server adapter, the one or more transaction specific market reference price data values for the at least one item as identified in the product specification data set using data possessing consistent units of measure.

48. The system of claim 1, wherein the transformation of the market reference price data occurs independent of unit-of-measure conversion of data in the metric data for responsive items that are defined by a unit-of-measure.

49. The system of claim 1, wherein invocation of at least one subsequent evaluation service and/or execution of one or more transaction-specific instructions that pertain to at least one subsequent evaluation service causes the metrics application to generate at least one evaluation metric that provides a predefined performance measure, wherein at least one of the one or more evaluation metrics generated for the at least one item is a predefined data element that is automatically input into at least one predefined algorithm preassociated with the subsequent evaluation service to generate, at least in part, the predefined performance measure, and wherein the metrics application is further programmed to manage at least one user interface that, in operation, configures the remotely-located service provider server to communicate, via the network interface, the at least one performance measure to at least the user-agent controlled computing device from which the one or more product specification data sets were received and/or one or more outputs that were predefined in at least one user-agent customized instruction that pertains to the at least one subsequent evaluation service.

50. The system of claim 1, wherein at least one predefined instruction for managing metric data that pertains to the user-agent and the at least one evaluation service causes the metric server adapter to define at least one transaction-specific instructions that, when executed by the metrics application, causes the metrics application, in coordination with the metric server adapter, to produce electronic documentation as required to audit at least one evaluation metric previously generated for at least one item as identified in a received product specification data set, wherein the metrics application documents the data and process steps used by the at least one evaluation service to generate the at least one evaluation metric by replicating the process steps of the at least one evaluation service using the metric data that was previously associated with and used in each process step, and to manage at least one user interface that, in operation, configures the remotely-located service provider server to communicate, via the network interface, the electronic documentation to the user-agent controlled computing device from which the product specification data set was received and/or at least one computing device predefined to receive the electronic documentation in at least one user-agent customized instruction that pertains to the at least one evaluation service.

51. The system of claim 1, wherein the one or more transaction-specific market reference price data values produced for the at least one item as identified in the product specification data set comprise synthetic values that represent market information, and do not represent actionable prices for an actual bid or offer-to-sell.

52. The system of claim 1, wherein invocation of the at least one evaluation service and/or execution of one or more transaction-specific instructions causes the metrics application, in coordination with the metric server adapter, to generate at least one smoothed evaluation metric for the at least one item identified in the product specification data set.

53. The system of claim 1, wherein the discovered one or more relationships comprising a difference within the attribute data represent transitory data that is used by the at least one evaluation service and discarded.

54. The system of claim 1, wherein the metric application is further programmed to manage one or more interfaces that are customized for the user-agent, wherein upon identification of the user-agent to initiate the at least one evaluation service, the metrics application prepares at least one graphical user interface that includes one or more preconfigured drop-down menus preloaded with items and parameter values that were predefined by the user-agent, including an item type, a delivery location, a delivery method, a metric or source of metric data, the user-agent's vendors, or item sizes or transaction types.

55. The system of claim 1, wherein the metrics application is further programmed to manage one or more user interfaces that are dynamically customized for a specific industry, wherein in response to identification of the user-agent, the metrics application prepares at least one user interface that is preconfigured per industry terminology, industry standard, and/or industry practice, wherein the industry terminology, standard, or practice is generally understood and widely used by practitioners within the industry or represents a standard established by a standards-setting body.

56. The system of claim 1, wherein an item is a physical product, a raw material, an intangible product, a service, or a combination thereof.

57. The system of claim 1, wherein the metrics application is programmed to manage one or more user interfaces that, in operation, facilitate electronic communication services via the service provider server, wherein the electronic communication services include at least one of a chat window, streamed voice communications, e-mail, or notes or text.

58. The system of claim 1, wherein at least one user-agent customized instruction instructs the service provider server to communicate the one or more evaluation metrics generated for at least one item as identified in a product specification data set to one or more predefined outputs, wherein at least one predefined output comprises a third-party computing device that is not under the control of the user-agent or the service provider server.

59. The system of claim 1, wherein the metrics application is further programmed to manage one or more user interfaces that, in operation, enable a user-agent computing device to predefine one or more instructions for managing metric data that preassociate at least one item as predefined by the user-agent with one or more other items, a specific industry, a product group, an item type, or a combination thereof, and further causes the metric server adapter to store the one or more user-agent customized instructions in a memory accessible to the service provider server for retrieval when the at least one evaluation service is invoked by the metrics application in response to receipt of a product specification data set from the user-agent controlled computing device.

60. In a networked service provider environment usable via system-managed user interfaces, a system having a governing logic application for managing market reference data that operates independently from, yet in coordination with, a separate production application, the system comprising:
 a remotely-located service provider server comprising:
  a network interface;
  a non-transitory computer-readable medium having computer-executable instructions stored thereon, wherein the computer-executable instructions, when executed, implement a plurality of applications including:
   a metric server adapter; and
   a metrics application; and
  a processor in communication with the network interface and the computer-readable medium, wherein the processor is configured to execute the computer-executable instructions stored in the computer-readable medium;
 wherein:
  the metric server adapter is a governing logic application programmed to autonomously manage at least one evaluation service and a plurality of predefined instructions for managing metric data, including a user-agent's customized instructions or industry-specific instructions, to dynamically define transaction-specific instructions for adapting metric data, and to coordinate a conditional execution of transaction-specific instructions for adapting metric data by the metrics application, wherein one or more of the predefined instructions are preassociated with attributes predefined for an item and/or one or more parameter values, the parameter values representing attributes or conditions that are variable for specific items or transactions, and wherein the predefined instructions are stored in a memory accessible to the service provider server;

the metrics application is a production application programmed to control invocation of the at least one evaluation service and, in coordination with the metric server adapter, to conditionally execute one or more transaction-specific instructions for adapting metric data and generate one or more evaluation metrics that pertain to the user-agent and the at least one evaluation service, and to manage one or more user interfaces that facilitate communications with the remotely-located service provider server, and in operation, in response to receipt of a triggering event or at a predefined time or over a predefined interval of time, the metrics application configures the service provider server to:

retrieve, from one or more data storages accessible to the service provider server, at least one evaluation metric previously generated for at least one item as identified in at least one product specification data set or price data set that was previously processed by the service provider server for the user-agent, wherein the at least one item is defined by a plurality of attributes including two or more parameter values, or includes two or more items that are defined by a plurality of attributes that differ in accordance with at least one parameter value;

wherein the retrieval of at least one evaluation metric triggers the metrics application to automatically invoke the at least one evaluation service, wherein invoking the at least one evaluation service causes the metrics application to:

obtain metric data from at least one source accessible to the service provider server, wherein the obtained metric data represents market reference data for at least one item having attributes responsive to attributes as identified for the at least one item in the evaluation metric retrieved, and wherein each responsive item in the market reference data is defined by a plurality of attributes having attribute data that includes at least one parameter value and represents market reference price data associated with the one or more responsive items at a current time or period of time;

evaluate the plurality of attributes for each responsive item in the metric data relative to the plurality of attributes identified for the respective item in the retrieved evaluation metric to dynamically discover relations within the attribute data, wherein discovery of one or more relationships comprising a difference in the attribute data triggers an automatic disclosure of the one or more relationships to the metric server adapter, wherein the discovered relationships enable the metric server adapter to contextually determine which of the predefined instructions that pertain to the at least one evaluation service are applicable to the responsive item in the metric data, wherein the metric server adapter uses the attributes and one or more parameter values identified for the respective item in the retrieved evaluation metric with predefined instructions determined to be applicable to the responsive item in the metric data to dynamically define transaction-specific instructions for adapting the metric data for the respective item;

normalize the metric data by conditionally executing, in coordination with the metric server adapter, the transaction-specific instructions for adapting metric data as defined for each responsive item in the metric data, wherein execution of the at least one transaction-specific instruction causes one or more adjustment values to be generated and applied to the market reference price data for at least one responsive item that differs by at least one parameter value from the respective item in the retrieved evaluation metric, transforming the current market reference price data for the at least one responsive item and automatically producing one or more more-current transaction-specific market reference data sets for the respective item in the retrieved evaluation metric; and generate at least one more-current evaluation metric for the at least one item as identified in the retrieved evaluation metric, wherein the at least one more-current evaluation metric is based, at least in part, on the one or more more-current transaction-specific market reference data values produced for the at least one item in the retrieved evaluation metric;

wherein the metrics application is further programmed to manage at least one user interface that, in operation, triggers an event, via the network interface, which causes a user-agent controlled computing device to be activated and configured for a data exchange, and configures the remotely-located service provider server to communicate, via the network interface, the at least one more-current evaluation metric generated for the at least one item in the retrieved evaluation metric, and to execute movement of the data to at least a user-agent controlled computing device.

61. The system of claim 60, wherein invocation of the at least one evaluation service and/or execution of one or more transaction-specific instructions causes the metrics application to further generate at least one comparative metric, wherein at least one more-current evaluation metrics generated for the at least one item is divided by the retrieved evaluation metric, a predefined base market value, or one or more market values reported by an exchange or a third-party price reporting service for the at least one item, to generate a ratio or index value, and to manage at least one user interface to communicate, via the network interface, the at least one comparative metric to at least a user-agent controlled computing device.

62. The system of claim 60, wherein invocation of the at least one evaluation service and/or execution of one or more transaction-specific instructions causes the metrics application, in coordination with the metric server adapter, to generate at least one evaluation metric comprising a measure of the value of the difference between at least one more-current evaluation metric generated for the at least one item and the retrieved evaluation metric for the at least one item, wherein the value of the difference is expressed as a numerical value or a percent of change.

63. The system of claim 62, wherein the metrics application is further programmed to manage one or more user interfaces that, in operation, configure the remotely-located service provider server to communicate, via the network interface, the value of the difference between a more-current evaluation metric generated for the at least one item and a previously generated evaluation metric for the at least one item to at least a computing device under the control of the user-agent for visual display, and wherein the one or more user interfaces facilitate interactions that cause the metrics application to expose underlying data in one or more layers of detail, to simultaneously display different data in multiple windows, to display linked information, or to display the same data in a different form or from one or more different sources of metric data or as determined at a different period of time.

64. The system of claim 60, wherein execution of at least one transaction-specific instruction causes the metrics application, in coordination with the metric server adapter, to automatically update the at least one evaluation metric that was previously generated for the at least one item in response to occurrence of a predefined event, at a predefined time, or over a predefined interval of time, wherein the predefined interval of time includes a continuously sliding interval of time that represents a most current period of time.

65. The system of claim 60, wherein the metrics application is separate from the metric server adapter, and wherein coordinated operation of the metrics application with the metric server adapter enables the metrics application to algorithmically process the attribute data to dynamically identify at least one relationship comprising a difference within the attribute data, including a new or previously unknown relationship, and to produce the one or more transaction-specific market reference price data values, in coordination with the metric server adapter, without relying on a pre-constructed model having a predefined relationship that remains fixed within the model and outputs predictable results.

66. The system of claim 60, wherein execution of at least one transaction-specific instruction causes the metrics application to filter the one or more responsive items in the metric data for inclusion or exclusion using one or more predefined control values, criteria, and/or parameter values, before producing, in coordination with the metric server adapter, the one or more more-current transaction-specific market reference price data values for at least one item.

67. The system of claim 60, wherein the parameter values represent variable attributes including a grade, a rating measure, a species, an item type, a brand, a quantity, a size, a unit of measure, a tally, a location, a method of delivery, a delivery date, a time of service, a warranty, a payment term, or a transaction type.

68. The system of claim 60, wherein the metric server adapter is programmed to coordinate a conditional execution of transaction-specific instructions for adapting metric data by the metrics application, including:
  one or more formulas operationally combining data values and using variables relating to a plurality of items, parameters, events, or metric data sources; or
  a combination of instructions, including validation rules and/or statistical criteria, relating to a plurality of items, attributes, parameters, events, metric data sources, obtained market reference data, transaction-specific market reference price data values or evaluation metrics, the conditional execution of which is priority weighted, sequential, recursive, or subject to another method of control defined by the metric server adapter; or
  a combined evaluation service that includes one or more transaction-specific instructions for adapting metric data, wherein at least one evaluation service is further combined with at least one transaction-specific instruction that specifies employing a process step, action, function, utility, or subroutine, or wherein at least one evaluation service is combined with at least one other evaluation service, wherein the conditional execution of the combined evaluation service is priority weighted, sequential, recursive, or subject to another method of control defined by the metric server adapter.

69. The system of claim 60, wherein the metrics application is further programmed to manage one or more user interfaces that, in operation, configure the remotely-located service provider server to communicate, via the network interface, the one or more more-current evaluation metrics generated from the at least one item to at least a user-agent controlled computing device for visual display, wherein the one or more user interfaces facilitate interactions that cause the metrics application to expose underlying data in one or more layers of detail, to simultaneously display different data in multiple windows, to display linked information, or to display the same data in a different form or from one or more different sources of metric data or as determined at a different period of time.

70. The system of claim 60, wherein at least one subsequently-invoked evaluation service and/or one or more predefined instructions that pertain to the at least one subsequently-invoked evaluation service causes the metric server adapter to define at least one transaction-specific instruction that, when executed by the metrics application, causes at least one evaluation metric to be generated that provides a predefined performance measure, wherein the at least one more-current evaluation metric generated for the at least one item is a predefined data element that is automatically input into at least one predefined algorithm preassociated with the subsequently-invoked evaluation service and used to generate, at least in part, the predefined performance measure, and wherein the metrics application is further programmed to manage at least one user interface that, in operation, configures the remotely-located service provider server to communicate, via the network interface, the at least one performance measure to a user-agent controlled computing device and/or one or more outputs that were predefined in one or more user-agent customized instructions that pertain to the at least one subsequently-invoked evaluation service.

71. The system of claim 60, wherein invocation of the at least one evaluation service and/or execution at least one transaction-specific instruction for managing metric data enables the metric server adapter to identify an item from a plurality of attributes that were predefined and preassociated with the item by the user-agent, or alternately, to identify a plurality of attributes to be associated with a predefined item.

72. In a networked service provider environment usable via system-managed user interfaces, a system having a governing logic application for managing market reference data that operates independently from, yet in coordination with, a separate production application, the system comprising:
  a remotely-located service provider server comprising:
    a network interface;
    a non-transitory computer-readable medium having computer-executable instructions stored thereon, wherein the computer-executable instructions, when executed, implement a plurality of applications including:
      a metric server adapter; and
      a metrics application; and
    a processor in communication with the network interface and the computer-readable medium, wherein the processor is configured to execute the computer-executable instructions stored in the computer-readable medium;

wherein:
the metric server adapter is a governing logic application programmed to autonomously manage at least one evaluation service and a plurality of predefined instructions for managing metric data, including a user-agent's customized instructions or industry-specific instructions, to dynamically define transaction-specific instructions for adapting metric data, and to coordinate a conditional execution of transaction-specific instructions for adapting metric data by the metrics application, wherein one or more of the predefined instructions are preassociated with attributes predefined for an item and/or one or more parameter values, wherein the parameter values representing attributes or conditions are variable for specific items or transactions, and wherein the predefined instructions are stored in a memory accessible to the service provider server;

the metrics application is a production application programmed to control invocation of the at least one evaluation service and, in coordination with the metric server adapter, to conditionally execute one or more transaction-specific instructions for adapting metric data and generate one or more evaluation metrics that pertain to the user-agent and the at least one evaluation service, and to manage one or more interfaces that facilitate communications with the remotely-located service provider server, and in operation, in response to a triggering event or at a predefined time or over a predefined interval of time, the metrics application configures the service provider server to:

retrieve, from one or more data storages or data sources accessible to the service provider server, at least one product specification data set or price data set previously processed by the service provider server, wherein the at least one retrieved data set meets one or more criteria predefined in the at least one user-agent customized instruction and identifies at least one item defined by a plurality of attributes having attribute data that includes two or more parameter values, or identifies a plurality of items defined by a plurality of attributes that differ in accordance with at least one parameter value; and wherein the retrieval of at least one data set triggers the metrics application to automatically invoke the at least one evaluation service, wherein invoking the at least one evaluation service causes the metrics application to:

obtain metric data from at least one data source accessible to the service provider server for each retrieved data set, wherein the obtained metric data represents market reference data for at least one item having attributes that are responsive to attributes of the at least one item as identified in the retrieved data set, and wherein each responsive item in the market reference data is defined by a plurality of attributes having attribute data that includes at least one parameter value and represents market reference price data for the one or more responsive items at a current time or period of time;

evaluate the plurality of attributes defined for each responsive item in the metric data relative to the plurality of attributes for the respective at least one item as identified in the retrieved data set to dynamically discover relations within the attribute data, wherein discovery of one or more relationships comprising a difference in the attribute data triggers an automatic disclosure of the one or more relationships to the metric server adapter, wherein the discovered relationships enable the metric server adapter to contextually determine which of the predefined instructions that pertain to the user-agent and the at least one evaluation service are applicable to the responsive item in the metric data, wherein the metric server adapter uses the attributes and one or more parameter values identified for the respective item in the retrieved data set with predefined instructions determined to be applicable to the responsive item in the metric data to dynamically define transaction-specific instructions for adapting the metric data for the respective item;

normalize the metric data by conditionally executing, in coordination with the metric server adapter, the transaction-specific instructions for adapting metric data as defined for each responsive item in the metric data for the respective item, wherein execution of at least one transaction-specific instruction causes one or more adjustment values to be generated and applied to the market reference price data for at least one responsive item that differs by at least one parameter value from the respective at least one item identified in the retrieved data set, transforming the current market reference price data for the at least one responsive item and automatically producing one or more more-current transaction-specific market reference data values for the respective item as identified in the retrieved data set; and generate one or more evaluation metrics that pertain to the user-agent and the at least one evaluation service for the at least one item as identified in each retrieved data set, wherein each evaluation metric is based, at least in part, on the one or more more-current transaction-specific market reference price data values produced for the respective item as identified in the retrieved data set; and wherein the metrics application is further programmed to manage at least one user interface that, in operation, triggers an event, via the network interface, which causes a user-agent controlled computing device to be activated and configured for a data exchange, and configures the remotely-located service provider server to communicate, via the network interface, one or more evaluation metrics generated for the at least one item as identified in the at least one retrieved data set, and to execute movement of the data to at least a user-agent controlled computing device.

73. The system of claim 72, wherein the predefined interval of time includes a continuously sliding interval of time that represents a most current period of time.

74. The system of claim 72, wherein the at least one retrieved data set was previously received by the service provider server and stored in one or more data storages accessible to the service provider server.

75. The system of claim 72, wherein the metrics application is separate from the metric server adapter, and wherein coordinated operation of the metrics application with the metric server adapter enables the metrics application to algorithmically process the attribute data to dynamically identify at least one relationship comprising a difference within the attribute data, including a new or previously unknown relationship, and to produce one or more transaction-specific market reference price data values, in coordination with the metric server adapter, without relying on a pre-constructed model having a predefined relationship that remains fixed within the model and outputs predictable results.

76. The system of claim 72, wherein the predefined instructions for managing metric data were not predefined for a specific transaction.

77. The system of claim 72, wherein the parameter values represent variable attributes including a grade, a rating measure, a species, an item type, a brand, a quantity, a size, a unit of measure, a tally, a location, a method of delivery, a delivery date, a time of service, a warranty, a payment term, or a transaction type.

78. The system of claim 77, wherein delivery comprises a financial delivery.

79. The system of claim 77, wherein the delivery date or time of service is in the future, and comprises a forward price transaction type.

80. The system of claim 72, wherein at least one retrieved data set identifies a bundle of items defined by a plurality of attributes having attribute data that differs by at least one parameter value or wherein at least one item identified in at least one retrieved data set is a combined item that represents a packaged product or transaction, a tally, or an assembly of one or more component parts, wherein each component part is defined by a plurality of attributes having attribute data that differs by at least one parameter value.

81. The system of claim 80, wherein the combined item identified in at least one retrieved data set comprises a packaged set of transactions, wherein each transaction in the packaged set of transactions identifies at least one item that is defined by two or more parameter values, or a plurality of items that differ in accordance with at least one parameter value.

82. The system of claim 80, wherein at least one retrieved data set is a combined data set that combines a plurality of items or component parts that were identified by two or more user-agents, and wherein each item or component part in the combined data set is only offered in combination with all other items or component parts in the combined data set.

83. The system of claim 72, wherein price data associated with at least one item identified in a retrieved data set is specified as a formula in which the price of at least one item is to be determined at one or more times in the future using, at least in part, one or more market prices that are to be reported by a specific data source or one or more evaluation metrics that are to be generated by the service provider server, wherein the metrics application automatically obtains the one or more reported market prices or generates the one or more evaluation metrics at the one or more times as specified, wherein the metrics application automatically derives a price for at the least one item in accordance with the specified formula, and wherein the metrics application is further programmed to manage at least one user interface that, in operation, configures the service provider server to communicate, via the network interface, the price determined for the at least one item as identified in the retrieved data set to at least a user-agent controlled computing device.

84. The system of claim 72, wherein invocation of the at least one evaluation service and/or execution of one or more transaction-specific instructions causes at least one evaluation metric to be generated, wherein price data associated with the at least one item identified in a retrieved price data set is divided by at least one of the one or more more-current transaction-specific market reference price data values produced for the at least one item identified in the retrieved price data set, to generate a relative value metric comprising a ratio or index value.

85. The system of claim 84, wherein execution of one or more transaction-specific instructions causes the metrics application to filter the responsive items in the market reference data for inclusion or exclusion using the relative value metric generated for the at least one item as identified in each retrieved price data set, wherein only retrieved data sets with a ratio or index value less than or equal to one are communicated to the user-agent controlled computing device.

86. The system of claim 72, wherein invocation of the at least one evaluation service and/or execution of at least one transaction-specific instruction causes the metrics application to filter the responsive items in the metric data for inclusion or exclusion using one or more predefined control values and/or parameter values, before producing the one or more more-current transaction-specific market reference price data values for the at least one item identified in the retrieved data set.

87. The system of claim 72, wherein the metrics application is further programmed to manage at least one user interface that, in operation, configures the service provider server to facilitate data communication in XML format, enabling the metrics application to dynamically change, dynamically route, and/or pre-configure data for movement of the data in an integrated data exchange.

88. The system of claim 72, wherein the metric server adapter is programmed to coordinate a conditional execution of transaction-specific instructions for adapting metric data by the metrics application, including:
  one or more formulas operationally combining data values and using variables relating to a plurality of items, attributes, parameters, events, or metric data sources; or
  a combination of instructions, including validation rules and/or statistical criteria, relating to a plurality of items, attributes, parameters, vendors, events, metric data sources, obtained metric data, transaction-specific market reference price data values, or evaluation metrics, the conditional execution of which is priority weighted, sequential, recursive, or subject to another method of control defined by the metric server adapter; or
  a combined evaluation service that includes one or more transaction-specific instructions for adapting metric data, wherein at least one transaction-specific instruction is further combined with at least one other transaction-specific instruction that specifies employing a process step, action, function, utility, or subroutine, or wherein at least one evaluation service is combined with at least one other evaluation service, wherein the conditional execution of the transaction-specific instructions of the combined evaluation service is priority weighted, sequential, recursive, or subject to another method of control defined by the metric server adapter.

89. The system of claim 72, wherein invocation of the at least one evaluation service and/or execution of one or more transaction-specific instructions causes the metrics application, in coordination with the metric server adapter, to dynamically apply the transaction-specific instructions for adapting metric data defined by the metric server adapter for each of the one or more responsive items in the metric data and to only produce the one or more more-current transaction-specific market reference data values for the at least one item identified in the retrieved data set when the one or more adjustment values resulting from execution of the transaction-specific instructions have been satisfactorily applied.

90. The system of claim 72, wherein the at least one evaluation service and/or one or more predefined instructions that pertain to the user-agent and at least one evaluation service causes the metric server adapter to define at least one transaction-specific instruction that, when executed by the metrics application, causes the metrics application, in coordination with the metric server adapter, to evaluate each responsive item in the metric data for satisfaction of one or more predefined validation rules and/or statistical criteria and to only produce the one or more more-current transaction-specific market reference price data values for the at least one item identified in the retrieved data set using metric data that satisfies the predefined validation rules and/or statistical criteria, and further causes a plurality of responsive items in the metric data to be evaluated for collective satisfaction of at least one criterion including a total volume in units per item over the particular time or period of time; a measure of the frequency/liquidity of the responsive items over the particular time or period of time; a measure of the concentration/fragmentation of the responsive items by the type of transaction; or a measure of the concentration/fragmentation of the responsive items by the source of the metric data, and wherein the plurality of responsive items in the metric data are either determined to satisfy the at least one criterion and are used or are determined to not satisfy the at least one criterion and are excluded from use.

91. The system of claim 72, wherein at least one retrieved data set was exposed to the service provider server, via the network interface, by at least one seller-agent and/or third-party intermediary, without prompting by the service provider server, and wherein the at least one exposed data set was stored in at least one data storage accessible to the service provider server.

92. The system of claim 72, wherein at least one user-agent customized instruction that pertains to the at least one evaluation service causes the metric server adapter to define at least one transaction-specific instruction that, when executed, causes the metrics application to obtain metric data for at least one alternate item, wherein the alternate item is a substitute item and/or differs by at least one parameter value from the at least one item as identified in the retrieved data set, and further causes the metrics application, in coordination with the metric server adapter, to produce one or more more-current transaction-specific market reference price data values for the at least one item identified in the retrieved data set using, at least in part, metric data for the at least one alternate item.

93. The system of claim 92, wherein the use of metric data for items having attributes responsive to an alternate item or a substitute item that differs by at least one parameter value from the at least one item as identified in the retrieved data set requires the user-agent to predefine at least one user-agent customized instruction that preassociates the attributes and/or parameter values of the alternate or substitute item with the at least one item.

94. The system of claim 72, wherein at least one user-agent customized instruction that pertains to the at least one evaluation service causes the metric server adapter to define at least one transaction-specific instructions that, when executed, causes the metrics application to compare the at least one of the one or more more-current evaluation metrics generated for the at least one item in the retrieved data set to at least one previously-generated evaluation metric for the at least one item, a predefined base market value, or one or more market values reported by an exchange or a third-party price reporting service for the at least one item, and to manage at least one user interface that, in operation, configures the remotely-located service provider server to communicate a result of the comparison, via the network interface, to at least a user-agent controlled computing device.

95. The system of claim 72, wherein one or more predefined instructions that pertain to the user-agent and the at least one evaluation service causes the metric server adapter to define at least one transaction-specific instruction that, when executed by the metrics application, causes an automatic alert to be triggered in response to at least one of the one or more evaluation metrics generated for the at least one item identified in a retrieved data set exceeding or falling below a user-agent predefined trigger value for the at least one item, wherein the predefined trigger value is expressed as a numerical value, a percent of change, or a ratio or index value, and wherein the alert is communicated, via a system-managed user interface, to at least a user-agent controlled computing device.

96. The system of claim 72, wherein the metrics application is further programmed to manage at least one user interface that, in operation, configures the remotely-located service provider server to facilitate an integrated data exchange with at least one application running on a computing device in communication with the service provider server, and to execute movement of data representing at least one of the one or more evaluation metrics generated for at least one item as identified in the at least one retrieved data set to the application running on the computing device in the integrated data exchange, via the network interface, wherein the integrated data exchange does not include a pre-mapped or pre-structured electronic data interchange (EDI) transmission.

97. The system of claim 96, wherein the one or more evaluation metrics communicated in the integrated data exchange are used by the application running on the computing device in communication with the service provider server, at least in part, to update the cost of direct inputs to production, to value or re-value an item's replacement cost for accounting or insurance purposes, to evaluate a selling price or an offer price, to calculate or re-calculate a selling price or an offer price, to generate a competitive market price comparison, or to forecast a return on inventory or a return on investment (ROI).

98. The system of claim 96, wherein the one or more evaluation metrics communicated in the integrated data exchange are used by the application running on the computing device in communication with the service provider server, at least in part, to value or re-value an over-the-counter (OTC) or off-exchange transaction, a basis trade or a hedge transaction, a forward contract, or to represent, at least in part, a value for:
   at least one item underlying an exchange-traded contract, or
   one or more items or component parts of an exchange-for-physical (EFP) transaction or an exchange-for-swap transaction (EFS), or an exchange-traded contract executed using an exchange-approved alternate-execution-procedure.

99. The system of claim 72, wherein at least one computing device in communication with the service provider server is a mobile computing device.

100. The system of claim 72, wherein at least one user-agent customized instruction or at least one industry-specific instruction that pertains to the at least one invoked evaluation service enables the metric server adapter to identify an item from the plurality of attributes and/or parameter values that were predefined and the at least one user-agent customized instruction or the at least one industry-specific instruction and preassociated with the item, or alternately, to identify the plurality of attributes and/or parameter values to be associated with a predefined item.

101. The system of claim 100, wherein one or more of the predefined instructions for managing metric data that pertain to the at least one invoked evaluation service causes the metric server adapter to define at least one transaction-specific instruction for adapting metric data that, when executed, causes the metrics application to query one or more data sources accessible to the service provider server for metric data responsive to the at least one item identified in a retrieved data set, wherein the plurality of attributes and/or parameter values that were predefined for or preassociated with the at least one item are used to identify a responsive item in the metric data.

102. The system of claim 72, wherein invocation of the at least one evaluation service and/or execution of one or more transaction-specific instructions causes the metrics application to automatically query one or more databases or data sources accessible to the service provider server or to monitor one or more data streams to obtain metric data for one or more items responsive to the attributes of the at least one item identified in the retrieved data set.

103. The system of claim 72, wherein invocation of the at least one evaluation service and/or execution of one or more transaction-specific instructions causes the metrics application, in coordination with the metric server adapter, to generate at least one evaluation metric for the at least one item as identified in a retrieved data set under multiple evaluation scenarios, wherein at least one evaluation scenario references an alternate item, alternate parameter, alternate time or period of time, alternate metric data source, or combination thereof, or wherein at least one evaluation scenario causes the metrics application to filter the obtained metric data using one or more control values, criteria, or parameters before producing one or more more-current transaction-specific market price data values for the at least one item, wherein the at least one evaluation metric generated for the at least one item under each of the multiple evaluation scenarios are compared, and wherein the metrics application is further programmed to manage at least one user interface that, in operation, configures the service provider server to communicate a result of the comparison, via the network interface, to at least a user-agent controlled computing device.

104. The system of claim 72, wherein the metrics application is further programmed to manage one or more user interfaces that, in operation, configure the service provider server to communicate, via the network interface, at least one more-current evaluation metric generated for the at least one item as identified in at least one retrieved data set to at least a user-agent controlled computing device for visual display, and wherein the one or more user interfaces facilitate interactions that enable an exposure of underlying data in one or more layers of detail, a simultaneous display of different data in multiple windows, a display of linked information, or a display of the same data in a different form or from one or more different sources of metric data or as determined at a different period of time.

105. The system of claim 72, wherein invocation of the at least one evaluation service and/or execution of one or more transaction-specific instructions causes the metrics application to obtain only metric data resulting from a computer-based interaction and to use only electronically-created market reference price data to generate the one or more more-current evaluation metrics for the at least one item as identified in the at least one retrieved data set, and wherein the electronically-created metric data does not include human-reported transaction data or transaction data that was manually transcribed into a digital format.

106. The system of claim 72, wherein invocation of the at least one evaluation service and/or execution of one or more transaction-specific instructions causes the metrics application to obtain and use only metric data resulting from a purchase or executed contract to produce the one or more more-current transaction-specific market reference price data values for the at least one item as identified in the at least one retrieved data set.

107. The system of claim 72, wherein the at least one retrieved data set includes a quantity value for each item as identified in the retrieved data set, and wherein the one or more more-current transaction-specific market reference price data values produced for each item as identified in the retrieved data set comprises a comparable quantity.

108. The system of claim 72, wherein the at least one evaluation service and/or one or more predefined instructions for managing metric data that pertain to the user-agent and the at least one invoked evaluation service causes the metric server adapter to define at least one transaction-specific instruction that, when executed by the metrics application, causes data expressed in units of measure to be consistently converted into standardized or common units of measure, or units of measure as specified for the at least one item identified in the retrieved data set, and to only produce the one or more more-current transaction specific market reference price data values for the at least one item using data possessing consistent units of measure.

109. The system of claim 72, wherein the transformation of the market reference price data occurs independent of unit-of-measure conversion of data in the metric data for responsive items that are defined by a unit-of-measure.

110. The system of claim 72, wherein invocation of the at least one evaluation service and/or execution of one or more transaction-specific instructions causes the metrics application, in coordination with the metric server adapter, to generate at least one adjustment value corresponding to at least one parameter value of the responsive item that differs from the corresponding parameter value of the item as identified in the retrieved data set using one or more predefined algorithms that were preassociated with the at least one evaluation service, including a least squares or curve-fit algorithm, wherein the at least one adjustment value serves to minimize a difference between the responsive item with the differing parameter value and (1) an average of the market reference price data of responsive items in the obtained metric data for the respective item at the current time or period of time, or (2) an average of market reference price data generated from a control group of items that are responsive to the parameter value of the respective item identified in the retrieved data set, and wherein the at least one adjustment value is applied to the market reference price data for the responsive item with the differing parameter value in the metric data.

111. The system of claim 72, wherein at least one subsequently-invoked evaluation service and/or one or more predefined instructions that pertain to the subsequently-invoked evaluation service causes the metric server adapter to define at least one transaction-specific instruction which, when executed by the metrics application, causes a predefined performance measure to be generated, wherein at least one of the one or more more-current transaction-specific market reference data values produced for the at least one item and/or the at least one of the one or more evaluation metrics generated for the at least one item as identified in the retrieved data set is a predefined data element that is automatically input into at least one predefined algorithm preassociated with the subsequently-invoked evaluation service and used, at least in part, to generate the predefined performance measure, and wherein the metrics application is further programmed to manage at least one user interface that, in operation, configures the service provider server to communicate, via the network interface, the performance measure to at least a user-agent controlled computing device.

112. The system of claim 111, wherein the at least one predefined algorithm generates a business performance measure and/or a financial performance measure, that and wherein the algorithm was predefined in at least one user-agent customized instructions or at least one industry-specific instruction for managing metric data and preassociated with the at least one subsequently-invoked evaluation service.

113. The system of claim 111, wherein invocation of the at least one subsequently-invoked evaluation service and/or execution at least one transaction-specific instruction for managing metric data causes the metric application to generate one or more evaluation metrics that measure the performance of one or more purchasing strategies, one or more buyer-agents or seller-agents, one or more pre-negotiated contracts or programs, or a combination thereof, over one or more times or periods of time.

114. The system of claim 72, wherein the metrics application is programmed to manage one or more user interfaces that, in operation, facilitate the exposure of at least a subset of the data received or generated by the service provider server to at least one tracking system, and wherein the exposed data is defined by a time or period of time.

115. The system of claim 72, wherein the metrics application is programmed to manage one or more user interfaces that, in operation, facilitate control of one or more preprogrammed utilities or functions or applications running on the remotely-located service provider server or a user-agent controlled computing device in communication with the service provider server, and to execute movement of data in an integrated data exchange between the service provider server and the at least one preprogrammed utility or function or application, wherein the integrated data exchange does not include a pre-mapped or pre-structured electronic data interchange (EDI) transmission.

116. The system of claim 72, wherein the one or more more-current transaction specific market reference price data values and the one or more more-current evaluation metrics generated for the at least one item identified in the retrieved data set comprise synthetic values that represents market information and do not represent actual price data associated with an actionable bid or offer-to-sell.

117. The system of claim 72, wherein the metrics application is further programmed to manage at least one user interface that, in operation, enables a user-agent to predefine one or more instructions for managing metric data and preassociate the one or more instructions with attributes of an item, parameter, metric data source, vender, event, and/or one or more other instructions, and to store the predefined and pre-associated instructions in a memory for retrieval by the metric server adapter when the at least one evaluation service is invoked by the metrics application in response to the retrieval of at least one product specification data set or price data set previously processed by the service provider server on behalf of the user-agent.

118. The system of claim 72, wherein the discovered one or more relationships comprising a difference within the attribute data represent transitory data that is used by the at least one evaluation service and discarded.

119. The system of claim 72, wherein at least one user-agent customized instruction causes the metrics application to filter the stored product specification data sets or price data sets and only retrieve data sets that satisfy one or more criteria predefined in the at least one user-customized instruction, wherein the predefined criteria limit the eligible data sets for retrieval to a particular catalog or pre-negotiated program, a particular buyer-agent or group of buyer-agents, a particular seller-agent or group of seller-agents, a particular transaction type or transaction size, a particular event, a particular location, a particular time or period of time, or at least one predefined parameter value.

120. The system of claim 72, wherein execution of at least one user-agent customized instruction causes the metrics application, in coordination with the metric server adapter, to aggregate the more-current transaction specific market reference price data values produced for the at least one item as identified in each retrieved data set using one or more predefined or preselected methods or algorithms, and wherein the one or more more-current evaluation metrics communicated to at least the user-agent controlled computing device for the at least one item as identified in the retrieved data set are based, at least in part, on the aggregated more-current transaction specific market reference price data value produced for the at least one item.

121. The system of claim 72, wherein the metrics application is programmed to manage one or more user interfaces that, in operation, facilitate one or more electronic communication services via the service provider server, wherein the one or more electronic communication services include at least one of a chat window, streamed voice communications, e-mail, or notes or text.

122. The system of claim 72, wherein the metrics application is further programmed to manage at least one user interface that, in operation, enables a user-agent to predefine one or more instructions for managing metric data and preassociate the one or more instructions with attributes of an item, parameter, metric data source, vendor, event, or one or more other instructions, and to store the predefined and preassociated instructions in a memory for retrieval by the metric server adapter when the at least one evaluation service is invoked by the metrics application in response to the retrieval of at least one product specification data set or price data set previously processed by the service provider server on behalf of the user-agent.

123. In a networked service provider environment usable via system-managed user interfaces, a system having a governing logic application for managing market reference data that operates independently from, yet in coordination with, a separate production application, the system comprising:
    a remotely-located service provider server comprising:
        a network interface;
        a non-transitory computer-readable medium having computer-executable instructions stored thereon, wherein the computer-executable instructions, when executed, implement a plurality of applications including:
        a metric server adapter; and
        a metrics application; and
        a processor in communication with the network interface and the computer-readable medium, wherein the processor is configured to execute the computer-executable instructions stored in the computer-readable medium;
    wherein:
        the metric server adapter is a governing logic application programmed to autonomously manage at least one evaluation service and a plurality of predefined instructions for managing metric data, including a user-agent's customized instructions or industry-specific instructions, to dynamically define transaction-specific instructions for adapting metric data, and to coordinate a conditional execution of transaction-specific instructions for adapting metric data by the metrics application, wherein one or more of the predefined instructions are preassociated with attributes predefined for an item and/or one or more parameter values, the parameter values representing attributes or conditions that are variable for specific items or transactions, and wherein the predefined instructions are stored in a memory accessible to the service provider server, the metrics application is a production application programmed to control invocation of the at least one evaluation service and, in coordination with the metric server adapter, to conditionally execute one or more predefined instructions for adapting metric data and generate one or more evaluation metrics that that pertain to a user-agent and the at least one evaluation service, and to manage one or more interfaces that facilitate communications with the remotely-located service provider server, and in operation, in response to a triggering event or at a predefined time; or over a predefined interval of time, the metrics application automatically invokes the at least one evaluation service, wherein invoking the at least one evaluation service causes the metrics application to generate at least one evaluation metric for at least one item that was predefined in one or more of the user-agent's customized instructions and preassociated with the at least one evaluation service, wherein the at least one item is defined by attribute data that includes two or more predefined parameter values, or a plurality of items are defined by a plurality of attributes that differ in accordance with at least one predefined parameter value, and wherein identification of at least one item predefined by the user-agent further causes the metrics application to:

obtain metric data from at least one data source accessible to the service provider server for each predefined item, wherein the obtained metric data represents market reference data for at least one item having attributes that are responsive to attributes of the at least one predefined item, and wherein each responsive item in the market reference data is defined by a plurality of attributes having attribute data that includes at least one parameter value and represents market reference price data for the one or more responsive items at a current time or period of time;

evaluate the plurality of attributes defined for each responsive item in the metric data relative to the plurality of attributes for the respective item as predefined by the user-agent to dynamically discover relations within the attribute data, wherein the discovery of one or more relationships comprising a difference in the attribute data triggers an automatic disclosure of the one or more relationships to the metric server adapter, wherein the discovered relationships enable the metric server adapter to contextually determine which of the predefined instructions that pertain to the user-agent and the at least one evaluation service are applicable to the responsive item in the metric data, wherein the metric server adapter uses the attributes and one or more parameter values identified for the respective item as predefined by the user-agent with the predefined instructions determined to be applicable to the responsive item in the metric data to dynamically define transaction-specific instructions for adapting the metric data for the respective item;

normalize the metric data by conditionally executing, in coordination with the metric server adapter, the transaction-specific instructions for adapting metric data defined by the metric server adapter for each responsive item in the metric data for the respective item, wherein execution of at least one transaction-specific instruction causes one or more adjustment values to be generated and applied to the market reference price data for at least one responsive item in the metric data that differs by at least one parameter value from the respective item as predefined by the user-agent, transforming the current market reference price data for the at least one responsive item and automatically producing one or more transaction-specific market reference price data values for the respective item as predefined by the user-agent; and generate at least one evaluation metric that pertains to the user-agent and the at least one evaluation service for each item predefined by the user-agent, wherein each evaluation metric is based, at least in part, on the one or more transaction-specific market reference price data values produced for the respective item as predefined by the user-agent; and wherein the metrics application is further programmed to manage at least one user interface that, in operation, triggers an event, via the network interface, which causes at least a computing device under control of the user-agent to be activated and configured for a data exchange, and configures the service provider server to communicate, via the network interface, the at least one evaluation metric generated for the at least one item as predefined by the user-agent, and to execute movement of the data to at least one computing device under the control of the user-agent.

124. The system of claim 123, wherein the metrics application is further programmed to manage at least one interface that, in operation, enables the user-agent to predefine an item by a plurality of attributes including two or more parameter values and further enables the predefined item to be preassociated with one or more evaluation services, and to store the attributes in association with the predefined item, wherein the stored attributes are automatically associated with the item when the at least one evaluation service is invoked by the metric application.

125. The system of claim 123, wherein the metrics application is further programmed to manage at least one interface that, in operation, enables one or more instructions to be preassociated with attributes of an item, a parameter, a metric data source, a vendor, an event, and/or one or more other instructions, and stored by the metric server adapter in a memory accessible to the service provider server for retrieval when the at least one evaluation service is invoked by the metrics application.

126. The system of claim 123, wherein the metrics application is separate from the metric server adapter, and wherein coordinated operation of the metrics application with the metric server adapter enables the metrics application to algorithmically process the attribute data to dynamically identify at least one relationship comprising a difference within the attribute data, including a new or previously unknown relationship, and to produce one or more transaction-specific market reference price data values, in coordination with the metric server adapter, without relying on a pre-constructed model having a predefined relationship that remain fixed within the model and outputs predictable results.

127. The system of claim 123, wherein the predefined instructions for managing metric data were not predefined for a specific transaction.

128. The system of claim 123, wherein the predefined interval of time includes a continuously sliding interval of time that represents a most current period of time.

129. The system of claim 123, wherein the parameter value or values represent attributes that are variable for an item, including variable conditions that apply to the user-agent predefined item.

130. The system of claim 123, wherein invocation of the at least one evaluation service and/or execution of one or more transaction-specific instructions causes the metrics application to obtain metric data from two or more different data sources.

131. The system of claim 123, wherein invocation of the at least one evaluation service and/or execution of one or more transaction-specific instructions causes the metrics application to obtain metric data comprising a plurality of market transaction data sets, wherein each transaction data set was previously exposed by at least one buyer-agent or at least one seller-agent.

132. The system of claim 123, wherein the parameter value or values represent variable attributes including a grade, a rating measure, a species, an item type, a brand, a quantity, a size, a unit of measure, a tally, a location, a method of delivery, a delivery date, a time of service, a warranty, a payment term, or a transaction type.

133. The system of claim 132, wherein delivery comprises a financial delivery.

134. The system of claim 132, wherein the delivery date or time of service is in the future, and comprises a forward price transaction type.

135. The system of claim 123, wherein at least one predefined item comprises a bundle of items defined by a plurality of attributes having attribute data that differs by at least one parameter value, wherein the bundle of items is to be collectively evaluated as a single item, or wherein at least one predefined item is a combined item that represents a packaged product or transaction, a tally, or an assembly of one or more component parts, wherein each component part is defined by a plurality of attributes having attribute data that differs by at least one parameter value from another component part.

136. The system of claim 135, wherein at least one combined item comprises a packaged set of transactions, wherein each transaction in the packaged set of transactions includes at least one item that is defined by a plurality of attributes having attribute data that includes two or more parameter values, or a plurality of items defined by a plurality of attributes that differ in accordance with at least one parameter value.

137. The system of claim 123, wherein the metrics application is further programmed to manage at least one user interface that, in operation, enables a user-agent to predefine an item and to further preassociate the item with one or more other predefined items, item attributes, parameters, data storages or data sources, or vendors, or events, and/or with one or more other predefined instructions, collectively forming a compound, grouped, or multi-variant data element.

138. The system of claim 137, wherein at least one instruction for managing metric data that was predefined by the user-agent further associates a unique label or code with the predefined compound, grouped, or multi-variant data element, wherein in response to identification of the unique label or code, the metric server adapter automatically applies the one or more predefined instructions that collectively form the compound, grouped, or multi-variant data element.

139. The system of claim 123, wherein invocation of the at least one evaluation service and/or execution of one or more transaction-specific instructions causes the metrics application to evaluate the obtained metric data for satisfaction of one or more predefined validation rules and/or statistical criteria and to only generate the one or more transaction-specific market reference price data values for the predefined item using metric data that satisfies the predefined validation rules and/or statistical criteria, wherein the one or more predefined validation rules and/or statistical criteria cause the metrics application to evaluate the metric data for collective satisfaction of at least one of: a total volume in units per item over the particular time or period of time; a measure of the frequency/liquidity of the responsive items over the particular time or period of time; a measure of the concentration/fragmentation of the responsive items by the type of transaction; or a measure of the concentration/fragmentation of the responsive items by the source of the metric data, and wherein the plurality of responsive items in the metric data are either determined to collectively satisfy the at least one criterion and are used, or are determined to not collectively satisfy the criterion and are excluded from use.

140. The system of claim 123, wherein the metric server adapter is programmed to coordinate a conditional execution of the transaction-specific instructions for adapting metric data by the metrics application, including:
  one or more formulas operationally combining data values and using variables relating to a plurality of items, attributes, parameters, events, or metric data sources; or
  a combination of instructions, including validation rules and/or statistical criteria, relating to a plurality of items, attributes, parameters, events, metric data sources, obtained market reference data, transaction-specific market reference data values or evaluation metrics, the execution of which is priority weighted, sequential, recursive, or subject to another method of control defined by the metric server adapter; or
  a combined evaluation service that includes one or more transaction-specific instructions for adapting metric data, wherein at least one transaction-specific instruction is further combined with at least one other transaction-specific instruction that specifies employing a process step, action, function, utility, or subroutine, or wherein at least one evaluation service is combined with at least one other evaluation service, wherein the conditional execution of the transaction-specific instructions of the combined evaluation service is priority weighted, sequential, recursive, or subject to another method of control defined by the metric server adapter.

141. The system of claim 123, wherein a coordinated execution of one or more transaction-specific instructions by the metrics application causes the metrics application, in coordination with the metric server adapter, to produce the one or more transaction-specific market reference price data values for the predefined item based, at least in part, on a formula, rule, or correlation that is applied to the market reference price data for at least one other item, wherein the at least one other item is an alternate item or a substitute item that differs by at least one parameter value from the predefined item.

142. The system of claim 141, wherein the use of metric data having attributes responsive to an alternate item or a substitute item that differs by at least one parameter value from the at least one item as predefined by the user-agent requires the user-agent to predefine at least one user-agent customized instruction that preassociates the attributes and/or parameter values of the alternate or substitute item with the at least one item.

143. The system of claim 123, wherein execution of one or more transaction-specific instructions causes the metrics application to compare the one or more transaction specific market reference price data values produced for at least one predefined item to a transaction specific market reference price data value produced for at least one other predefined item by the service provider server, wherein the other item is a different item or an item that differs by at least one parameter value, and further causes the metrics application to manage at least one user interface that, in operation, configures the service provider server to communicate, via the network interface, the comparison to at least one computing device under the control of the user-agent.

144. The system of claim 123, wherein invocation of the at least one evaluation service and/or one or more predefined instructions cause the metric server adapter to define at least one transaction-specific instruction that, when executed by the metrics application, causes the metrics application to obtain more-current metric data for at least one item having attributes responsive to attributes defined for the at least one item as predefined in at least one user-agent customized instruction that was preassociated with the at least one evaluation service, wherein the obtained metric data includes more-current market reference price data for the item or excludes previously-obtained metric data that is no longer responsive to the item or no longer represents market reference price data associated with the item at a particular time or period of time, and further causes the metrics application, in coordination with the metric server adapter, to generate at least one more-current evaluation metric for the item using the more-current transaction-specific market reference price data values produced for the at least one item as predefined by the user-agent.

145. The system of claim 144, wherein the metrics application is further programmed to manage at least one user interface that, in operation, configures the service provider server to communicate, via the network interface, the at least one more-current evaluation metric generated for the at least one predefined item to at least one computing device under the control of the user-agent.

146. The system of claim 144, wherein invocation of the at least one evaluation service and/or execution of one or more transaction-specific instructions causes the metrics application to generate at least one more-current evaluation metric for the at least one item as predefined by the user-agent, at a predefined time, or over a predefined interval of time, in response to occurrence of a predefined event, or continuously, wherein a sliding interval of time represents a most current period of time.

147. The system of claim 144, wherein at least one more-current evaluation metric is generated for at least one predefined item over a series of times, periods of time, and/or delivery dates, wherein the series of times, periods of time, and/or delivery dates can include one or more times in the future.

148. The system of claim 144, wherein execution of one or more transaction-specific instructions causes the metrics application to trigger an automatic alert in response to the at least one more-current evaluation metric generated for at least one item exceeding or falling below a predefined trigger value that was predefined for the at least one item by the user-agent, wherein the predefined trigger value is expressed as a numerical value, a percent of change, or a ratio or index value, and wherein the alert is communicated, via a system-managed user interface, to at least one computing device under the control of the user-agent.

149. The system of 148, wherein exceeding or falling below a predefined trigger level further causes the metrics application to receive or retrieve a plurality of price data sets representing current offers to sell that are responsive to attributes of the at least one user-agent predefined item, wherein the metrics application configures the remotely-located service provider server to automatically (1) communicate, via a system-managed user interface, at least one request for quote for at least one user-agent predefined item to at least one seller-agent computing device on behalf of the user-agent, and to receive, from the at least one seller-agent computing device via the network interface, one or more price data sets responsive to at least one item, and/or (2) filter one or more of the user-agent's pre-negotiated programs, contracts, catalogs, or unsolicited offers previously exposed to the service provider server, to retrieve one or more price data sets representing current offers to sell that are responsive to the at least one user-agent predefined item, wherein receipt of one or more price data sets causes the metric application, in coordination with the metric server adapter, to automatically generate one or more evaluation metrics for the at least one item as identified in each of the price data sets, and wherein the metrics application is further programmed to manage one or more user interfaces that, in operation, causes at least one computing device under the control of the user-agent to be activated and configured for a data exchange, and configures the service provider server to communicate, via the network interface, at least one of the plurality of received or retrieved price data sets and the corresponding one or more evaluation metrics generated for the at least one item as identified in each of the communicated price data sets to at least one computing device under the control of the user-agent.

150. The system of claim 144, wherein execution of one or more predefined instructions that pertain to the user-agent and the at least one evaluation service causes the metrics application to manage at least one user interface that, in operation, configures the service provider server to communicate, via the network interface, the at least one more current evaluation metric generated for the at least one predefined item to at least one computing device under control of a third-party that was predefined to receive the one or more more-current evaluation metrics in at least one predefined instruction that pertains to the user-agent and the at least one evaluation service.

151. The system of claim 123, wherein invocation of the at least one evaluation service and/or execution of one or more transaction-specific instructions further causes the metrics application to compare the at least one evaluation metric generated for the item as predefined by the user-agent to at least one previously-generated evaluation metric for the item as predefined by the user-agent, a predefined base market value, or one or more market values reported by an exchange or a third-party price reporting service for the one or more items, and to manage at least one user interface that, in operation, configures the service provider server to communicate a result of the comparison, via the network interface, to at least one computing device under the control of the user-agent.

152. The system of claim 123, wherein invocation of the at least one evaluation service and/or execution of one or more transaction-specific instructions causes the metrics application, in coordination with the metric server adapter, to generate at least one evaluation metric, wherein the one or more transaction-specific market reference price data values produced for the user-agent predefined item is compared to a futures exchange reported price for a traded contract that represents market reference price data for an item that is responsive to the attributes of the at least one predefined item, and to manage at least one user interface that, in operation, configures the service provider server to communicate, via the network interface, the result of the comparison to at least one computing device under the control of the user-agent.

153. The system of claim 152, wherein invocation of the at least one evaluation service and/or execution of one or more transaction-specific instructions causes the metrics application to generate at least one evaluation metric comprising a measure of the value of the difference between at least one of the one or more transaction-specific market reference price data values produced for the at least one user-agent predefined item and a futures exchange reported price for a traded contract that is responsive to the attributes of the user-agent predefined item.

154. The system of claim 152, wherein invocation of the at least one evaluation service and/or execution of at least one transaction-specific instruction further causes the metrics application to generate at least one evaluation metric, wherein at least one of the one or more transaction-specific market reference price data values produced for the user-agent predefined item is a predefined data value that is automatically input into at least one predefined algorithm preassociated with the at least one evaluation service to generate, at least in part, a value for the user-agent predefined item at one or more times in the future, wherein the at least one predefined algorithm calculates one or more adjustments that are to be applied to the at least one transaction-specific market reference price data value produced for the user-agent predefined item, including at least one adjustment for a cost to hold and/or store the at least one user-agent predefined item from the current time or period of time until one or more times or periods of time in the future.

155. The system of claim 123, wherein the metrics application is further programmed to manage at least one interface that, in operation, configures the remotely-located service provider server to facilitate an integrated data exchange between the processor of the service provider server and at least one application running on at least one other computing device in communication with the service provider server, via the network interface, and to execute movement of the at least one evaluation metric generated for at least one user-agent predefined item in an integrated data exchange, wherein the integrated data exchange does not include a pre-mapped or pre-structured electronic data interchange (EDI) transmission.

156. The system of claim 155, wherein the at least one evaluation metric communicated in the integrated data exchange is used by the application running on the at least one computing device under the control of the user-agent, at least in part, to value or re-value an item's replacement cost for accounting or insurance purposes, to update the cost of direct inputs to production, to evaluate a selling price or an offer price, to calculate or re-calculate a selling price or an offer price, to generate a competitive market price comparison, or to forecast a return on inventory or a return on investment (ROI).

157. The system of claim 155, wherein the at least one evaluation metric communicated in the integrated data exchange is used by the application running on the at least one computing device under the control of the user-agent, at least in part, to value an over-the-counter (OTC) or off-exchange transaction, a basis trade or a hedge transaction, a forward contract, or to represent, at least in part, a value for:
  at least one item underlying an exchange-traded contract, or
  one or more items or component parts of an exchange-for-physical (EFP) transaction or an exchange-for-swap transaction (EFS), or an exchange-traded contract executed using an exchange-approved alternate-execution-procedure.

158. The system of claim 123, wherein invocation of the at least one evaluation service and/or execution of one or more transaction-specific instructions causes the metrics application to automatically query one or more databases or data sources accessible to the service provider server or to monitor one or more data streams to obtain metric data for one or more items responsive to attributes of the at least one user-agent predefined item.

159. The system of claim 158, wherein invocation of the at least one evaluation service and/or execution of one or more transaction-specific instructions causes the metrics application to query transaction data previously aggregated by a tracking system under control of the service provider server to obtain metric data for at least one item having attributes responsive to attributes of the at least one item as predefined by the user-agent, wherein the data stored by the tracking system represents market reference data received or generated by the service provider server for a plurality of user-agents, including unaffiliated user-agents, at a particular time or over a period of time.

160. The system of claim 123, wherein execution of at least one transaction-specific instruction causes the metrics application to filter, for inclusion or exclusion, the responsive items in the metric data using one or more predefined control values, criteria, or parameters, and to use only a filtered segment of the obtained market reference price data to generate the at least one evaluation metric for the at least one user-agent predefined item.

161. The system of claim 123, wherein invocation of the at least one evaluation service and/or execution of one or more transaction-specific instructions causes the metrics application to consistently convert data expressed in units of measure into standardized or common units of measure, or units of measure specified for the at least one user-agent predefined item, and to only produce the one or more transaction-specific market reference price data values for the at least one user-agent predefined item using data possessing consistent units of measure.

162. The system of claim 123, wherein the transformation of the market reference price data occurs independent of unit-of-measure conversion of data in the metric data for responsive items that are defined by a unit-of-measure.

163. The system of claim 123, wherein at least one subsequently-invoked evaluation service and/or one or more pre-defined instructions for managing metric data that pertain to the at least one subsequently-invoked evaluation service causes the metric server adapter to define at least one transaction-specific instruction that, when executed by the metrics application, causes a predefined performance measure to be generated, wherein the at least one evaluation metric generated for at least one user-agent predefined item is a predefined data element that is automatically input into at least one predefined algorithm associated with the subsequent evaluation service and used, at least in part, to generate the predefined performance measure, and wherein the metrics application is further programmed to manage at least one user interface that, in operation, configures the service provider server to communicate, via the network interface, the at least one evaluation metric to at least one computing device under the control of the user-agent.

164. The system of claim 123, wherein the metrics application is further programmed to manage at least one user interface that, in operation, configures the service provider server to facilitate data communication in XML format, enabling the metrics application to dynamically change, dynamically route, and/or pre-configure data for movement of the data in an integrated data exchange.

165. The system of claim 123, wherein at least one other computing device in communication with the service provider server is a mobile computing device.

166. The system of claim 123, wherein invocation of the at least one evaluation service and/or execution of one or more transaction-specific instructions causes the metrics application, in coordination with the metric server adapter, to generate the at least one evaluation metric for the one or more user-agent predefined items under multiple evaluation scenarios, wherein at least one evaluation scenario references an alternate item, alternate parameter, alternate time or period of time, alternate metric data source, or combination thereof, or wherein at least one evaluation scenario causes the metrics application to filter the obtained market reference data using one or more control values, criteria, or parameters before generating the evaluation metric for the one or more items, wherein the evaluation metric generated for the one or more items under each of the multiple evaluation scenarios are compared, and wherein the metrics application is further programmed to manage at least one interface that, in operation, configures the service provider server to communicate a result of the comparison, via the network interface, to at least one computing device under the control of the user-agent.

167. The system of claim 123, wherein the metrics application is further programmed to manage one or more user interfaces that, in operation, configure the service provider server to communicate, via the network interface, for visual display the at least one evaluation metric generated for the at least one predefined item to at least one computing device under the control of the user-agent, and wherein the one or more user interfaces facilitate interactions that enable an exposure of underlying data in one or more layers of detail, a simultaneous display of different data in multiple windows, a display of linked information, or a display of the same data in a different form or from one or more different sources of metric data or as determined at a different period of time.

168. The system of claim 123, wherein invocation of the at least one evaluation service and/or execution of one or more transaction-specific instructions causes the metrics application to obtain only metric data resulting from a computer-based interaction and to use only electronically-created market reference price data to produce the one or more transaction-specific market reference price data values for the at least one user-agent predefined item, wherein the electronically-created market reference price data does not include human-reported transaction data or transaction data that was manually transcribed into a digital format.

169. The system of claim 123, wherein invocation of the at least one evaluation service and/or execution of one or more transaction-specific instructions causes the metrics application to obtain and use only metric data resulting from a purchase or executed contract to produce the one or more transaction-specific market reference price data values for the at least one user-agent predefined item.

170. The system of claim 123, wherein the at least one user-agent predefined item includes a quantity value for the predefined item, and wherein the one or more transaction-specific market reference price data values produced for the predefined item comprises a comparable quantity.

171. The system of claim 123, wherein the at least one evaluation metric generated for the at least one user-agent predefined item comprises a synthetic value that represents market information and does not represent actual price data associated with an actionable bid or offer-to-sell.

172. The system of claim 123, wherein the discovered one or more relationships comprising a difference within the attribute data represent transitory data that is used by the at least one evaluation service and then discarded.

173. The system of claim 123, wherein the metrics application is programmed to manage one or more user interfaces that, in operation, facilitate integrated electronic communications via the service provider server, wherein the integrated electronic communications include at least one of a chat window, streamed voice communications, e-mail, or notes or text.

174. The system of claim 123, wherein the metrics application is programmed to manage one or more user interfaces that, in operation, facilitate exposing at least a subset of the data received or generated by the service provider server to at least one tracking system, wherein the exposed data is defined by a time or period of time.

175. The system of claim 123, wherein the at least one item predefined by the user-agent pertains to a physical product, a raw material, an intangible product, a service, or a combination thereof.

176. The system of claim 123, wherein at least one user-agent customized instruction instructs the service provider server to communicate at least one evaluation metric generated for at least one item predefined by the user-agent to one or more predefined outputs, including third-party computing devices not under the control of either the user-agent or the service provider server, and wherein the metrics application is programmed to manage one or more user interfaces that, in operation, causes the remotely-located service provider server to be configured to communicate, via the network interface, the one or more evaluation metrics generated for at least one user-agent predefined item to the one or more outputs predefined by the user-agent.

* * * * *